(12) United States Patent
Benisty

(10) Patent No.: US 10,275,378 B2
(45) Date of Patent: Apr. 30, 2019

(54) DATA BUFFER POINTER FETCHING FOR DIRECT MEMORY ACCESS

(71) Applicant: Western Digital Technologies, Inc., Irvine, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 125 days.

(21) Appl. No.: 15/452,039

(22) Filed: Mar. 7, 2017

(65) Prior Publication Data

US 2018/0260347 A1    Sep. 13, 2018

(51) Int. Cl.
*G06F 3/06* (2006.01)
*G06F 13/16* (2006.01)
*G06F 13/28* (2006.01)

(52) U.S. Cl.
CPC .............. *G06F 13/28* (2013.01); *G06F 3/061* (2013.01); *G06F 3/0659* (2013.01); *G06F 3/0688* (2013.01); *G06F 13/1673* (2013.01)

(58) Field of Classification Search
CPC .............. G06F 13/4226; G06F 13/4239; G06F 13/4213; G06F 13/4282; H04W 56/00
See application file for complete search history.

(56) References Cited

U.S. PATENT DOCUMENTS

| 8,977,786 B1* | 3/2015 | Sonksen | G06F 13/10 |
| | | | 709/212 |
| 2004/0010663 A1* | 1/2004 | Prabhu | G06F 12/0804 |
| | | | 711/143 |
| 2007/0091101 A1* | 4/2007 | Huang | G06F 9/3879 |
| | | | 345/506 |
| 2011/0320688 A1 | 12/2011 | Lee | |
| 2014/0331001 A1 | 11/2014 | Liu et al. | |
| 2016/0026388 A1 | 1/2016 | Jeong et al. | |
| 2016/0062669 A1 | 3/2016 | Chu et al. | |
| 2016/0259555 A1* | 9/2016 | Karamcheti | G06F 3/0604 |
| 2016/0291868 A1* | 10/2016 | Halaharivi | G06F 3/061 |
| 2016/0292100 A1* | 10/2016 | Olcay | G06F 13/28 |
| 2016/0342545 A1 | 11/2016 | Arai et al. | |

OTHER PUBLICATIONS

"NVM Express," NVM Express, Inc., Revision 1.2.1, Jun. 5, 2016, 217 pages.
International Search Report & The Written Opinion of the International Searching Authority dated Feb. 20, 2018, International Application No. PCT/US2017/062896.

* cited by examiner

*Primary Examiner* — Idriss N Alrobaye
*Assistant Examiner* — Ronald T Modo
(74) *Attorney, Agent, or Firm* — Vierra Magen Marcus LLP

(57) ABSTRACT

Technology is described herein for operating non-volatile storage. In one aspect, a memory controller fetches pointers to data buffers in host system memory just-in-time. For example, just before the memory system is ready perform a DMA the pointers may be fetched. The data buffer pointers may be NVMe Physical Region Page (PRP) entries in a PRP list. The same data buffer pointer need not be fetched more than once. For example, responsive to the non-volatile memory system determining that a data buffer pointer might be needed a second time (e.g., for a different DMA), that data buffer pointer is saved such that it can be re-used. In one aspect, if a DMA does access all of a host data buffer, the pointer to that buffer is saved so that it does not need to be fetched again.

20 Claims, 13 Drawing Sheets

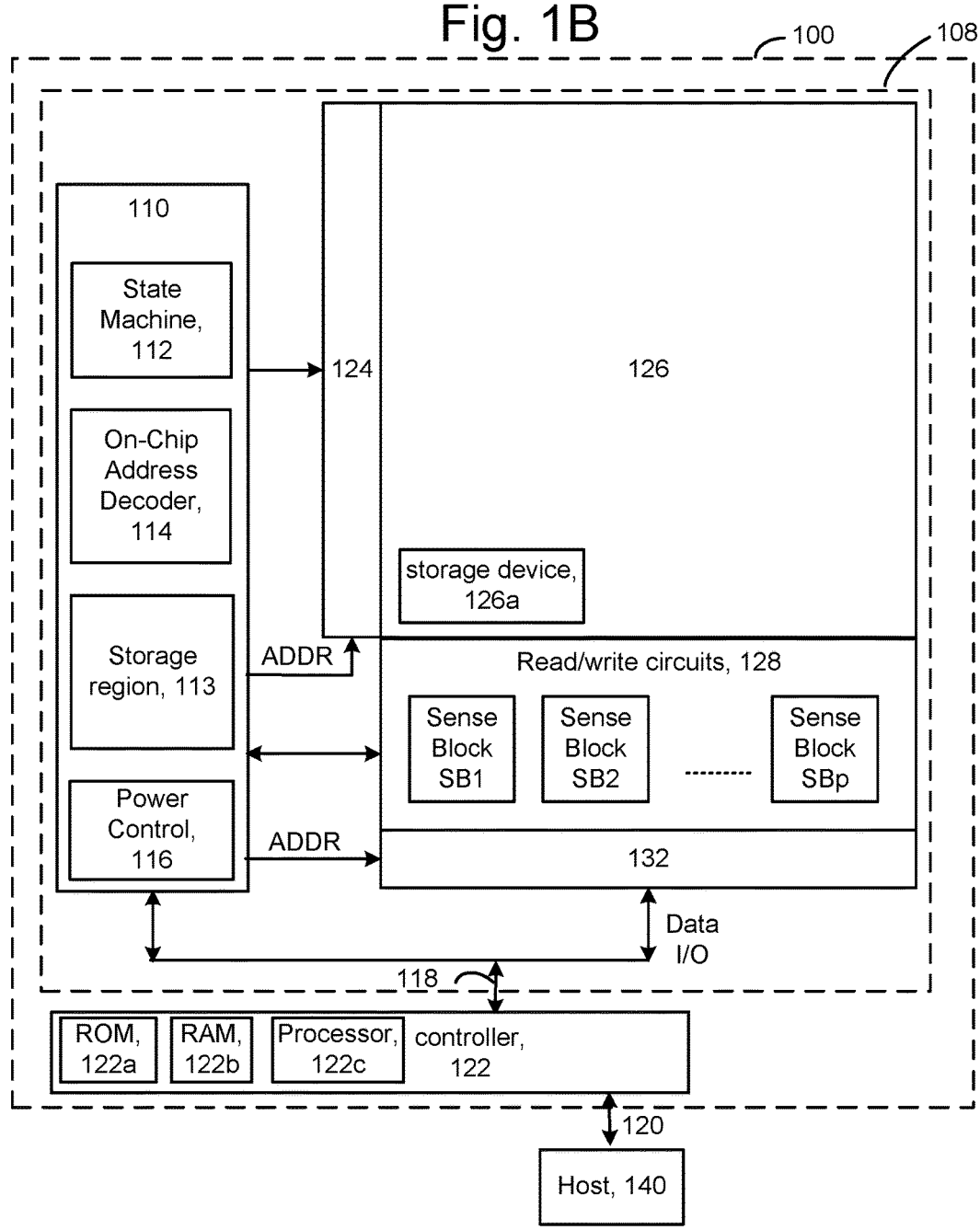

DATA BUFFER POINTER FETCHING FOR DIRECT MEMORY ACCESS

BACKGROUND

The present disclosure relates to technology for non-volatile storage.

One type of non-volatile storage is semiconductor memory. For example, non-volatile semiconductor memory is used in solid state drives, mobile computing devices, non-mobile computing devices and other memory systems. Typically, the memory system has a controller which controls data transfers between the memory system and a host system over a communication interface. The host system could be computer system, cellular telephone, server, etc. The memory system and host system may exchange data over, for example, a Peripheral Computer Interface Express (PCIe) bus. Non-volatile Memory Express (NVMe) is a logical device interface specification for accessing non-volatile storage attached via a PCIe bus. NVMe takes advantage of parallelism offered by semiconductor memory such as, but not limited to, solid state drives.

BRIEF DESCRIPTION OF THE DRAWINGS

FIG. 1B is a functional block diagram of a memory device such as the 3D stacked non-volatile memory device of FIG. 1A.

DETAILED DESCRIPTION

Figure 1A:
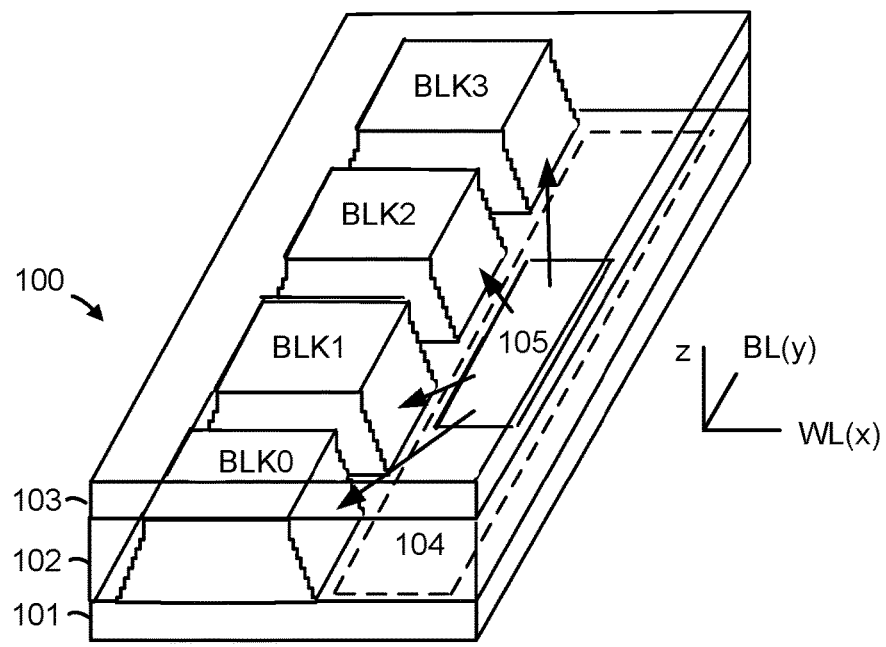
FIG. 1A is a perspective view of a set of blocks in a 3D stacked non-volatile memory device.

Technology is described herein for operating non-volatile storage. One embodiment is a controller in a non-volatile memory system that fetches pointers to data buffers in host system memory. In one embodiment, the data buffer pointers are fetched just-in-time. For example, if the data buffer pointers are fetched too soon, then memory in the non-volatile memory system may be wasted storing pointers. If the data buffer pointers are fetched too late, then performance may degrade due to a delay in data transfers.

In some embodiments, the data buffer pointers are NVMe Physical Region Page (PRP) entries in a PRP list, which may reside in memory of a host system connected to the non-volatile memory system. The data buffer pointers (e.g., NVMe PRP entries) are fetched over a Peripheral Component Interconnect express (PCIe) bus between the host system and non-volatile memory system, in one embodiment. Embodiments disclosed herein efficiently use the bandwidth of the PCIe bus. In some embodiments, the number of data buffer pointers (e.g., NVMe PRP entries) that are fetched results in efficient transfer over the PCIe bus.

Embodiments disclosed herein fetch data buffer pointers efficiently in a data packet used to transfer data over a physical interface (e.g., PCIe bus) between the host system and the memory system. For example, data may be transferred over a PCIe bus using a Transaction Layer Packet (TLP). In some embodiments, the TLP packet size is selected for efficient transfer. For example, the number of buffer pointers (e.g., NVMe PRP entries) in the data payload may be selected for efficient transfer.

Embodiments disclosed herein reduce or eliminate fetching the same data buffer pointer (e.g., NVMe PRP entry) more than once. Some conventional techniques may fetch the same data buffer pointer (e.g., NVMe PRP entry) more than once, which is inefficient. In one embodiment, responsive to the non-volatile memory system determining that a data buffer pointer might be needed a second time (e.g., for a different DMA), that data buffer pointer is saved such that it can be re-used. Thus, that data buffer pointer need not be fetched a second time. However, note that if the non-volatile memory system determines that a data buffer pointer will not be needed again, then the data buffer pointer may be removed (or overwritten) from storage in the memory system. Thus, memory is used efficiently. This can help reduce cache sizes, which can reduce device area.

Embodiments disclosed herein allow data to be transferred out of order, even within a specific command. For example, a single read command from the host system may result in separate read operations to several memory dies. The read operations may proceed in parallel, wherein the order in which the memory dies finish their read operation may be indeterminate. In one embodiment, the memory system fetches data buffer pointers just before data that was read as a result of a read operation to a memory die is ready to transfer to the host system. This allows for out of order data transfer (as well as out of order fetching of data buffer pointers). Note that the out of order data transfer allows the data that is ready next to be transferred next. This also provides for efficient use of storage space in the memory system, as it can reduce the number of data buffer pointers that are stored in the memory system.

Technology described herein may be used with a variety of types of non-volatile memory. One example is a three-dimensional (3D) non-volatile memory system. However, embodiments may also be practiced in two-dimensional (2D) non-volatile memory system. FIG. 1A is a perspective view of a set of blocks in a 3D stacked non-volatile memory device. The memory system 100 includes a substrate 101. On the substrate are example blocks BLK0, BLK1, BLK2 and BLK3 of memory cells (storage elements) and a peripheral area 104 with circuitry for use by the blocks. For example, the circuitry can include voltage drivers 105 which can be connected to control gate layers of the blocks. In one approach, control gate layers at a common height in the blocks are commonly driven. The substrate 101 can also carry circuitry under the blocks, along with one or more lower metal layers which are patterned in conductive paths to carry signals of the circuitry. The blocks are formed in an intermediate region 102 of the memory device. In an upper region 103 of the memory device, one or more upper metal layers are patterned in conductive paths to carry signals of the circuitry. Each block comprises a stacked area of memory cells, where alternating levels of the stack represent control gate layers. In one possible approach, the control gate layers of each block at a common height are connected to one another and to a voltage driver. While four blocks are depicted as an example, two or more blocks can be used, extending in the x- and/or y-directions.

The length of the plane, in the x-direction, may represent a direction in which signal paths to word lines extend in the one or more upper metal layers (e.g., a word line or SGD line direction), and the width of the plane, in the y-direction, represents a direction in which signal paths to bit lines extend in the one or more upper metal layers (e.g., a bit line direction). The z-direction represents a height of the memory device.

FIG. 1B is a functional block diagram of a memory device such as the 3D stacked non-volatile memory system 100 of FIG. 1A. The functional block diagram may also be used for a 2D non-volatile memory system. The memory system 100 may include one or more memory die 108. The set of blocks of FIG. 1A can be on one die. The memory die 108 includes a memory structure 126 of memory cells, such as an array of memory cells, control circuitry 110, and read/write circuits 128. In a 3D configuration, the memory structure can include the blocks of FIG. 1A. The memory structure 126 is addressable by word lines via a row decoder 124 and by bit lines via a column decoder 132. The read/write circuits 128 include multiple sense blocks SB1, SB2, . . . , SBp (sensing circuitry) and allow a page of memory cells to be read or programmed in parallel. Typically a controller 122 is included in the same memory system 100 (e.g., a removable storage card) as the one or more memory die 108. Commands and data are transferred between the host 140 and controller 122 via a data bus 120 and between the controller and the one or more memory die 108 via lines 118.

Multiple memory elements in structure 126 may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

Other types of non-volatile memory in addition to NAND flash memory can also be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory elements can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

The memory structure 126 can be two-dimensional (2D) or three-dimensional (3D). The memory structure 126 may comprise one or more arrays of memory elements (also referred to as memory cells). In a two dimensional memory structure, the semiconductor memory elements are arranged in a single plane or a single memory device level. Typically, in a two dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

A three dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

The memory structure may comprise a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements. The columns may be arranged in a two dimensional configuration, e.g., in an x-y plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

One of skill in the art will recognize that this technology is not limited to the two dimensional and three dimensional exemplary structures described but covers all relevant memory structures within the spirit and scope of the technology as described herein and as understood by one of skill in the art.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The control circuitry 110 cooperates with the read/write circuits 128 to perform memory operations on the memory structure 126, and includes a state machine 112, an on-chip address decoder 114, and a power control module 116. The state machine 112 provides chip-level control of memory operations. A storage region 113 may be provided for parameters for operating the memory device such as programming parameters for different rows or other groups of memory cells. These programming parameters could include bit line voltages and verify voltages.

The on-chip address decoder 114 provides an address interface between that used by the host or a memory controller to the hardware address used by the decoders 124 and 132. The power control module 116 controls the power and voltages supplied to the word lines and bit lines during memory operations. It can includes drivers for word line layers (WLLs) in a 3D configuration, SGS and SGD select gates and source lines. The sense blocks can include bit line drivers, in one approach. An SGS select is a gate transistor at a source-end of a NAND string, and an SGD select gate is a transistor at a drain-end of a NAND string.

In some implementations, some of the components can be combined. In various designs, one or more of the components (alone or in combination), other than memory structure 126, can be thought of as at least one control circuit which is configured to perform the actions described herein. For example, a control circuit may include any one of, or a combination of, control circuitry 110, state machine 112, decoders 114/132, power control module 116, sense blocks SB1, SB2, . . . , SBp, read/write circuits 128, controller 122, and so forth.

The off-chip controller 122 may comprise a processor 122*c* and storage devices (memory) such as ROM 122*a* and RAM 122*b*. The storage devices comprises code such as a set of instructions, and the processor is operable to execute the set of instructions to provide the functionality described herein. Alternatively or additionally, the processor can access code from a storage device 126*a* of the memory structure, such as a reserved area of memory cells in one or more word lines.

The code is used by the controller 122 to access the memory structure 126 such as for programming, read and erase operations. The code can include boot code and control code (e.g., a set of instructions). The boot code is software that initializes the controller during a booting or startup process and enables the controller to access the memory structure. The code can be used by the controller to control one or more memory structures. Upon being powered up, the processor 122*c* fetches the boot code from the ROM 122*a* or storage device 126*a* for execution, and the boot code initializes the system components and loads the control code into the RAM 122*b*. Once the control code is loaded into the RAM, it is executed by the processor. The control code includes drivers to perform basic tasks such as controlling and allocating memory, prioritizing the processing of instructions, and controlling input and output ports.

Figure 2A:
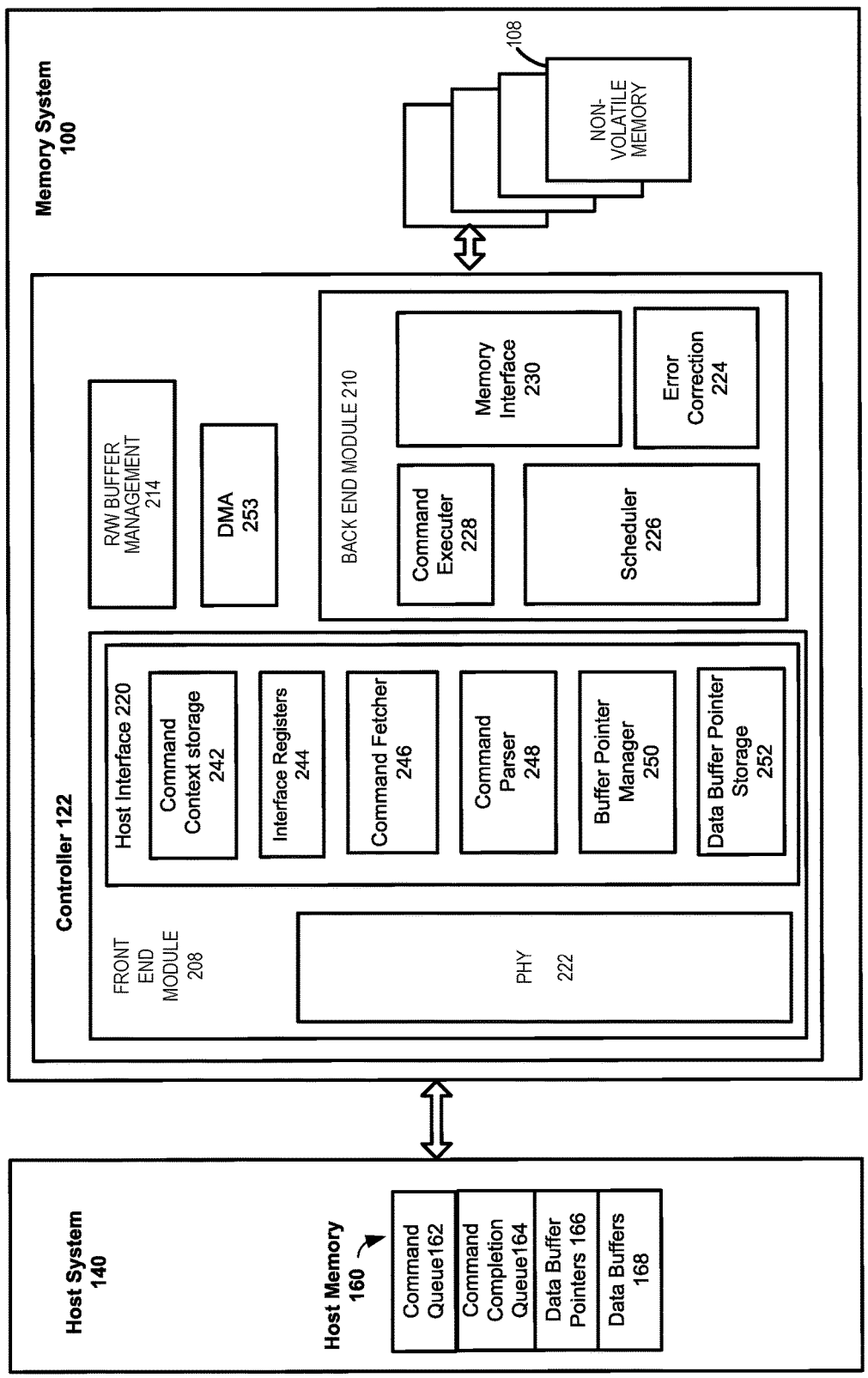
FIG. 2A is a block diagram of example memory system, depicting more details of Controller and Host.

FIG. 2A is a block diagram of example memory system 100, depicting more details of one embodiment of Controller 122 and Host system 140. In one embodiment, the system of FIG. 2A is a solid state drive. As used herein, a memory Controller is a device that manages data stored on a memory system and communicates with a host system, such as a computer or electronic device. A memory Controller can have various functionality in addition to the specific functionality described herein. For example, the memory Controller can format the memory to ensure the memory is operating properly, map out bad flash memory cells, and allocate spare memory cells to be substituted for future failed cells. Some part of the spare cells can be used to hold firmware to operate the memory Controller and implement other features. In operation, when a host needs to read data from or write data to the flash memory, it will communicate with the memory Controller. If the host provides a logical address (LA) to which data is to be read/written, the flash memory Controller can convert the logical address received from the host to a physical address in the memory. (Alternatively, the host can provide the physical address). The memory Controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The host system 140 has host memory 160. In one embodiment, host memory 160 includes command submission queues (SQs) 162 and command completion queues (CQs) 164. Commands to access non-volatile memory 108 may be placed by the host into a submission queue 162. For example, a command might be to read or write non-volatile memory 108. In one embodiment, a submission queue 162 is a circular buffer with a fixed size slot. In one embodiment, the host informs the memory system when a new command has been placed on a submission queue 162. One such mechanism is referred to herein as a "doorbell."

The controller 122 may write to an associated completion queue 164 to post status for completed commands. In one embodiment, a completion queue 164 is a circular buffer with a fixed size slot.

Data buffers 168 may be used to store data to be written to non-volatile memory 108 or to store data that was read from non-volatile memory 108. The controller 122 may perform a DMA of data from data buffers 168, as a part of writing data to non-volatile memory 108. For example, the controller 122 may transfer write data from data buffers 168 to write buffers in memory system. The controller 122 may perform a DMA of data to data buffers 168, as a part of reading data from non-volatile memory 108. For example, the controller 122 may transfer read data from read buffers in memory system to data buffers 168.

The host memory 160 also includes data buffer pointers 166. The data buffer pointers 166 identify locations in the data buffers 168. In embodiments, the memory controller 122 uses the data buffer pointers 166 to perform DMAs to satisfy a read or write command.

In one embodiment, the submission queues (SQs) 162, completion queues (CQs), and data buffer pointers 166 are compliant with NVM Express. In one embodiment, the data buffer pointers 166 are NVMe "Physical Region Page" (PRP) entries. However, the submission queues (SQs) 162, completion queues (CQs), and data buffer pointers 166 are not required to be compliant with NVM Express.

The interface between Controller 122 and non-volatile memory die 108 may be any suitable interface. In one embodiment, memory system 100 may be a card based system, such as a secure digital (SD) or a micro secure digital (micro-SD) card. In an alternative embodiment, memory system 100 may be part of an embedded memory system. For example, the memory may be embedded within the host, such as in the form of a solid state disk (SSD) drive installed in a personal computer.

In some embodiments, non-volatile memory system 100 includes a single channel between Controller 122 and non-volatile memory die 108, the subject matter described herein is not limited to having a single memory channel. For example, in some memory system architectures, 2, 4, 8 or more channels may exist between the Controller and the memory die, depending on Controller capabilities. In any of the embodiments described herein, more than a single channel may exist between the Controller and the memory die, even if a single channel is shown in the drawings.

As depicted in FIG. 2A, Controller 122 includes a front end module 208 that interfaces with host system 140, a back end module 210 that interfaces with the one or more non-volatile memory die 108, and various other modules that perform functions which will now be described in detail.

The components of Controller 122 depicted in FIG. 2A may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include or comprise software stored in a processor readable device (e.g., memory) to program a one or more processors for Controller 122 to perform the functions described herein. The architecture depicted in FIG. 2A is one example implementation that may (or may not) use the components of Controller 122 depicted in FIG. 1B (e.g., RAM 122b, ROM 122a, processor 122c).

Controller 122 may interface with one or more memory dies 108. In one embodiment, Controller 122 and multiple memory dies (together comprising non-volatile storage system 100) implement a solid state drive (SSD), which can emulate, replace or be used instead of a hard disk drive inside a host, as a NAS device, etc. Additionally, the SSD need not be made to work as a hard drive.

Referring again to modules of the Controller 122, a read/write (R/W) buffer manager 214 manages buffers in random access memory (RAM). These buffers may include write buffers and read buffers. RAM may be used as a temporary buffer to store data from host 140 to be written to non-volatile memory 108. RAM may also be used as a temporary buffer to store data read from non-volatile memory 108 to be transferred to host 140. The R/W buffer manager 214 may also control the internal bus arbitration of Controller 122. A read only memory (ROM) stores system boot code.

The RAM and ROM are not explicitly depicted in FIG. 2A. In one embodiment, RAM and/or ROM are located within controller 122. In one embodiment, RAM and/or ROM are located external to controller 122. In yet other embodiments, portions of RAM and ROM may be located both within the Controller 122 and outside the Controller. Further, in some implementations, the Controller 122, RAM, and ROM may be located on separate semiconductor die.

Front end module 208 includes a host interface 220 and a physical layer interface (PHY) 222 that provide the electrical interface with the host or next level storage Controller. In one embodiment, the PHY 222 is Peripheral Component Interconnect Express (PCIe). However, PHY 222 is not limited to PCIe.

The host interface 220 typically facilitates transfer for data, control signals, and timing signals. The choice of the type of host interface 220 can depend on the type of memory being used. In some embodiments, host interface 220 is compliant with NVM Express (NVMe). NVMe is a logical device interface that may be used to access non-volatile storage attached when using a PCIe bus between the host 140 and the memory system 100. However, note that host interface 220 is not limited to NVMe. The host interface 220 in includes a command context storage 242, interface registers 244, command fetcher 246, command parser 248, buffer pointer manager 250, and data buffer pointer storage 252.

Figure 7:
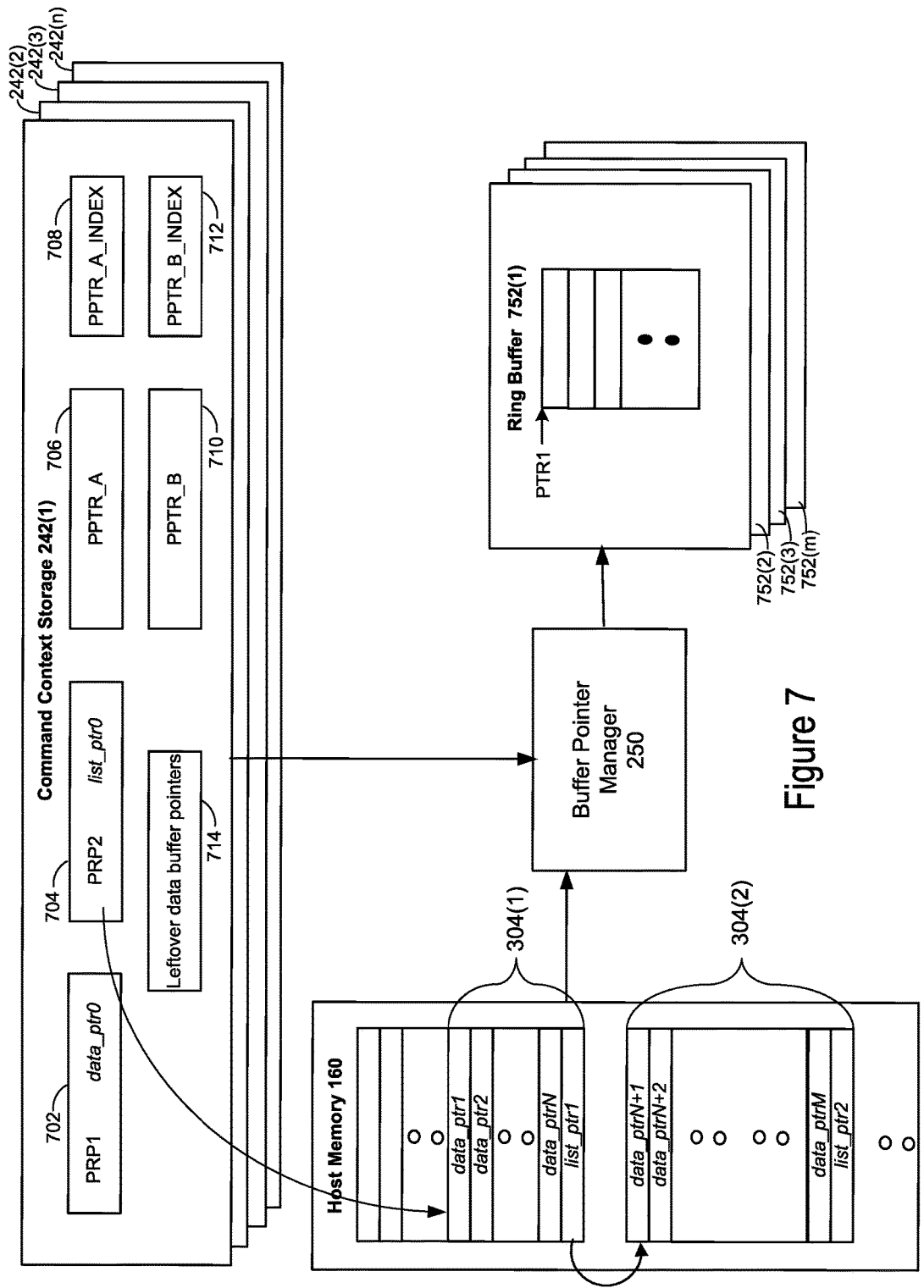
FIG. 7 is a diagram of one embodiment of command context storage, ring buffers, buffer pointer manager, and host memory.

Command context storage 242 is used to store information for a command from the host that the memory controller is presently processing. This information may include pointers to lists of pointers in host memory 160. In one embodiment, there is a separate command context for each outstanding read or write command from the host system 140. However, it is not required that all types of commands from the host system 140 have information stored in a command context. FIG. 7 shows further details of one embodiment of command context storage 242.

Interface registers 244 include various registers for use in providing the host interface. In one embodiment, one of the registers is a "doorbell register", which the host may write in one embodiment to inform the memory system that a new command is on the SQ 162. Command fetcher 246 is configured to fetch a new command from an SQ 162. Command parser 248 is configured to parse the new command. In one embodiment, the command parser 248 analyzes data pointer fields in the command to determine how the memory controller should handle accessing data buffer pointers.

Data buffer pointer storage 252 is used to store pointers to data buffers in host memory. In one embodiment, data buffer pointer storage 252 is used to store NVMe PRP entries. PRP entries may be used in NVMe as pointers to data buffers in host memory. In one embodiment, there is one data buffer pointer storage 252 for each memory die 108. Buffer pointer manager 250 may be configured to access data buffer pointers from host memory and transfer them to a data buffer pointer storage 252.

Back end module 210 includes a Scheduler 226, command executor 228, an error correction Controller (ECC) engine 224, and a memory interface 230.

Command scheduler 226 generates command sequences, such as program, read, and erase command sequences, to be transmitted to non-volatile memory die 108. Command executor 228 oversees execution of those commands.

Memory interface 230 provides the command sequences to non-volatile memory die 108 and receives status information from non-volatile memory die 108. In one embodiment, memory interface 230 may be a double data rate (DDR) interface. In some embodiments, the memory interface 203 is a flash memory interface. However, the memory cells in non-volatile memory 108 are not limited to flash. Hence, memory interface 230 is not limited to a flash memory interface. In the event that memory 108 is flash, the back end module 210 may include a flash control layer, which controls the overall operation of back end module 210.

ECC engine 224 encodes the data bytes received from the host system 140, and decodes and error corrects the data bytes read from the non-volatile memory 108. In one embodiment, the ECC engine 224 comprises a low-density parity check (LDPC) decoder.

DMA 253 is configured to control Direct Memory Access (DMA) transfer of data between the memory system 100 and memory 160 in host system 140. For example, DMA 253 may access data from host data buffers 168 and transfer it to write buffers in RAM (e.g., FIG. 1B, 122b). DMA 253 may use data buffer pointers 166 that are provided from host interface 220 to access the correct location in host data buffers 168. DMA 253 may transfer data from read buffers in RAM 122b and transfer to host data buffers 168. DMA 253 may use data buffer pointers 166 that are provided from host interface 220 to access the correct location in host data buffers 168 to transfer data read from non-volatile memory 108. Note that for both reads and writes, back end module 210 may perform additional processing of the data such as Error correction, scrambling, etc. Thus, for example, the data that is transferred to the host data buffers 168 is typically not the raw data read from non-volatile memory 108.

Figure 2B:
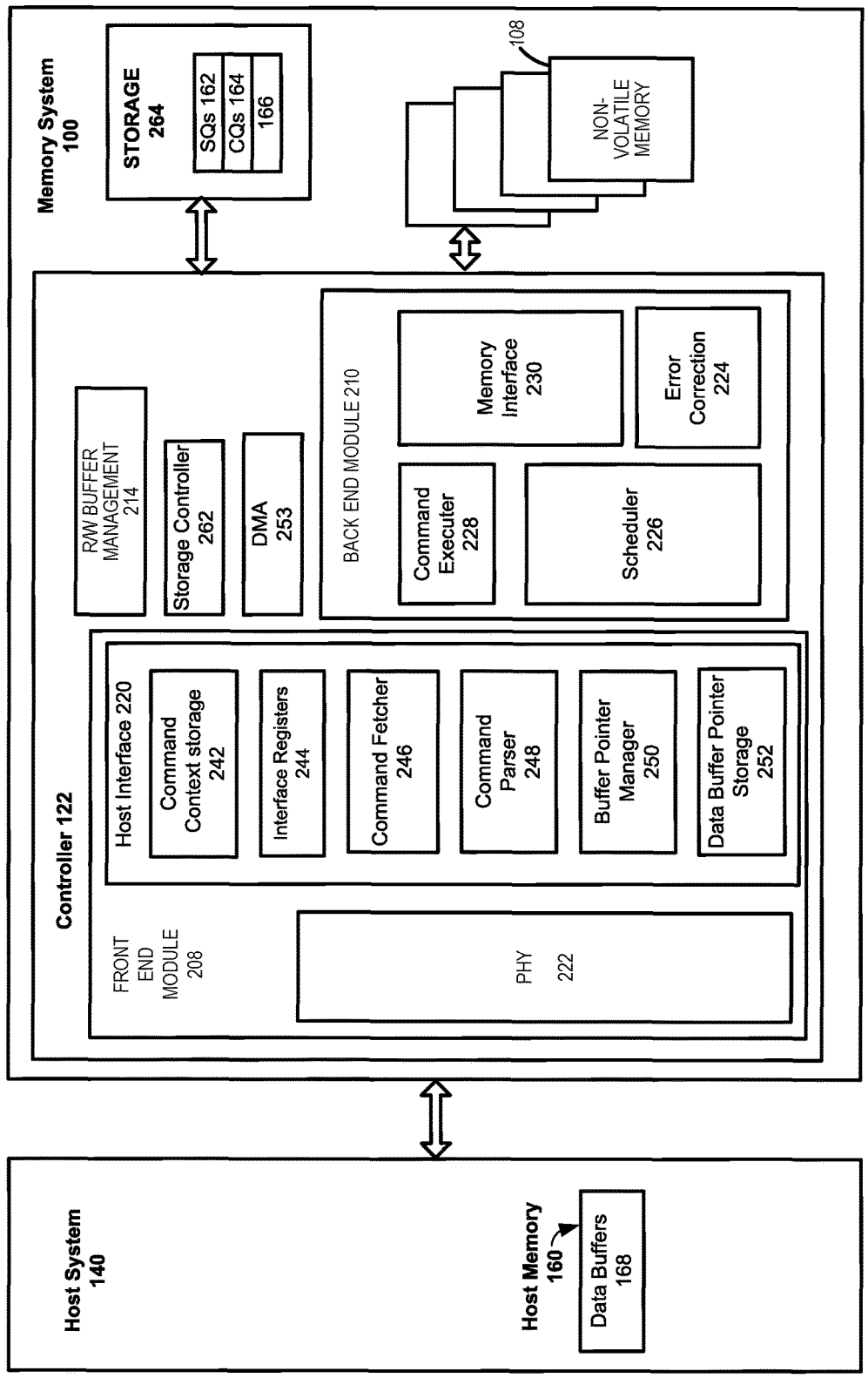
FIG. 2B is a diagram of one embodiment of an enterprise environment.

FIG. 2B is a diagram of one embodiment of an enterprise environment. In this embodiment, SQs 162, CQs, and data buffer pointers 166 are stored in storage 264 (also referred to as "a storage unit"). Storage 264 may be implemented by, but is not limited to, RAM, DRAM, ReRAM. In one embodiment, storage 264 is part of non-volatile memory 108. For example, storage 264 can be flash memory cells in a memory array. Storage 264 is coupled to controller 122 over some physical communication link. The portion of storage 264 that stores the SQs 162, CQs, and data buffer pointers 166 may serve as a controller memory buffer (CMB). The CMB is compliant with a CMB of an NVMe specification, in one embodiment. The submission queues (SQs) 162 in storage 264 allow the host system 140 to directly write commands to the memory controller's internal memory space, in one embodiment. This alleviates the need for the memory controller to access commands from host memory. The data buffer pointers 166 in storage 264 allow the host system 140 to directly write the data buffer pointers to the memory controller's internal memory space, in one embodiment. A CMB based SQs 162, CQs, and data buffer pointers 166 may be used in a similar manner when the SQs 162, CQs, and data buffer pointers 166 are stored on the host system. A difference being that the memory controller's memory space is used instead of host memory.

The controller 122 has storage controller 262 to manage transferring data between storage 264 and storage in controller 122. For example, data from storage 264 may be transferred to command context storage 242, interface registers 244, and/or data buffer pointer storage 252. Thus, command context storage 242, interface registers 244, and/ or data buffer pointer storage 252 may be internal to the controller 122. This internal storage might be RAM, registers, etc.

Note that in the embodiment of FIG. 2B, there may be any number of host interfaces 220.

In the embodiment of FIG. 2B, host memory 160 contains data buffers 168. Thus, the controller 122 may initiate DMAs to/from data buffers 168 based on data buffer pointers. However, in one embodiment, the memory controller 122 first transfers data buffer pointers from region 166 of storage 264 to data buffer pointer storage 252, which resides within controller 122 in one embodiment.

Other variations to the embodiments depicted in FIGS. 2A and 2B are possible. For example, any subset of the SQs 162, CQs 164, and data buffer pointers 166 may be stored in storage 264 of memory system 100. For example, SQs 162 and CQs 164 are stored in storage 264, but data buffer pointers 166 are stored in host memory 160, in one embodiment.

Figure 3A:
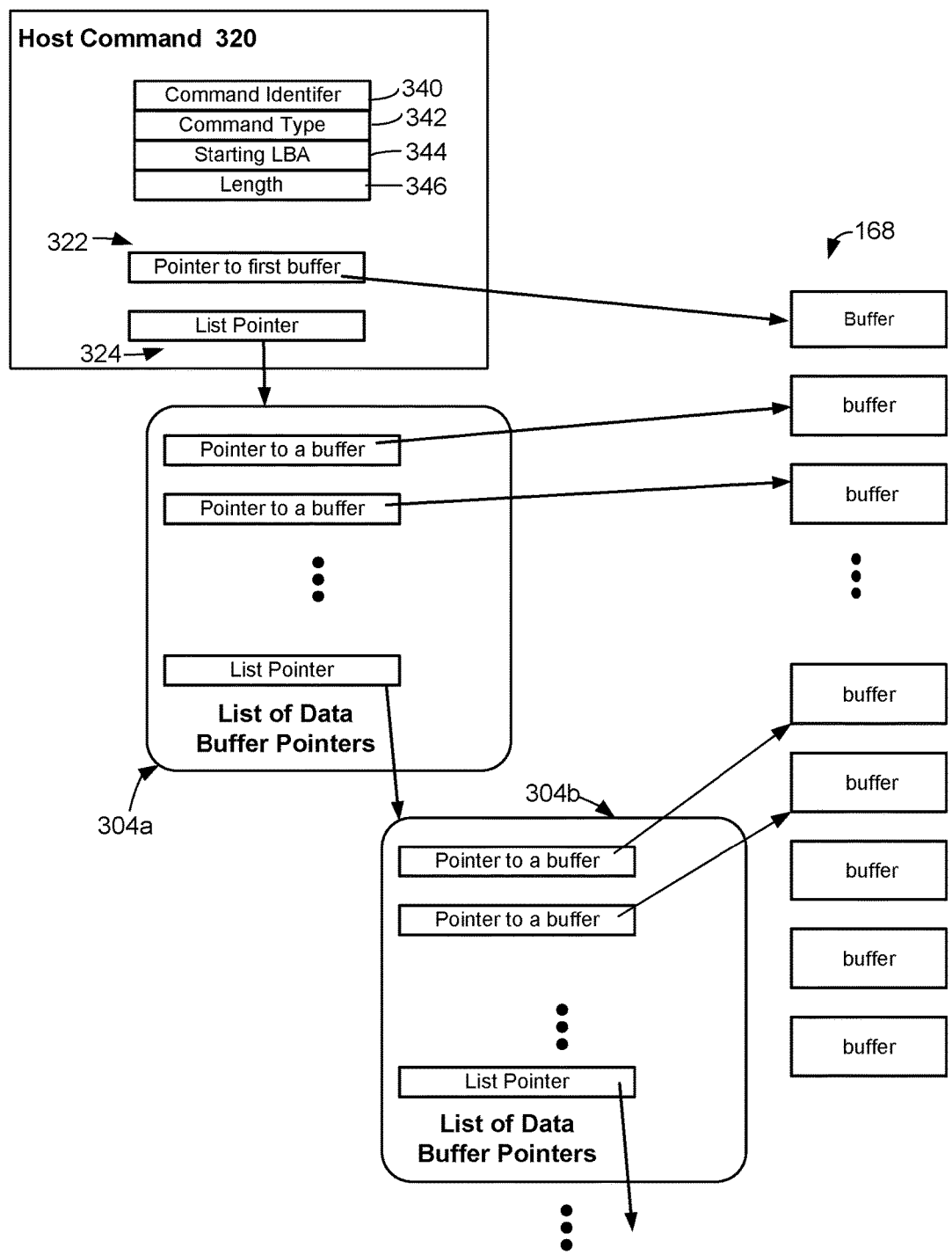
FIG. 3A is a diagram of one example of a host command, host data buffers, and lists of data buffer pointers.

FIG. 3A is a diagram of one example of a host command 320, host data buffers 168, and lists 304 of data buffer pointers. In one embodiment, each of the host data buffers is a physical page in host memory. Also, each of the lists 304 is a physical page in host memory, in one embodiment. The lists 304 reside in data buffer pointers 166 in host memory 160, in one embodiment. However, note that lists 304 could reside in the memory system 100. For example, with respect to the embodiment of FIG. 2B, lists 304 could reside in data buffer pointers 166 in storage 264 that is coupled to the controller 122 over a physical communication link.

The host system may place the host command 320 on SQs 162 in host memory 160, in one embodiment. The host system may place the host command 320 on SQs 162 in storage 264, in one embodiment. Note that the host command 302 could be for a memory access operation, such as write (also referred to as "program") or read. The command identifier 340 may be used to identify the command. In other words, the command identifier 340 may distinguish one read command from another read command, etc. The memory controller 122 may use this command identifier 340 to provide status for the completed command on the completion queue (e.g., FIG. 2A, 164 or FIG. 2B, 164). The command type 342 indicates the type of command (e.g., read, write, etc.). The starting LBA field 344 indicates the starting logical block address (LBA) for a read or write. The length field 346 is for the length of the read or write. The length could be specified as a number of logical blocks. Note that the memory controller 122 may convert the starting LBA, as well as other LBAs as indicated by the length of the read or write, to physical addresses in non-volatile memory 108.

A host command 320 includes field 322 and field 324. Field 322 and field 324 may contain data pointers. For example, field 322 may point to a data buffer in host memory. Field 324, if used, may point to a list of data buffer pointers in host memory, in one embodiment. Note that in some embodiments, field 324, if used, may point to a list of data buffer pointers in storage 264 (see FIG. 2B). The host command 320 may have other fields as well. For example, various fields may be used for data management, such as whether the data is compressible, whether this command is part of a sequential request, latency requirements, etc.

Figure 3B:
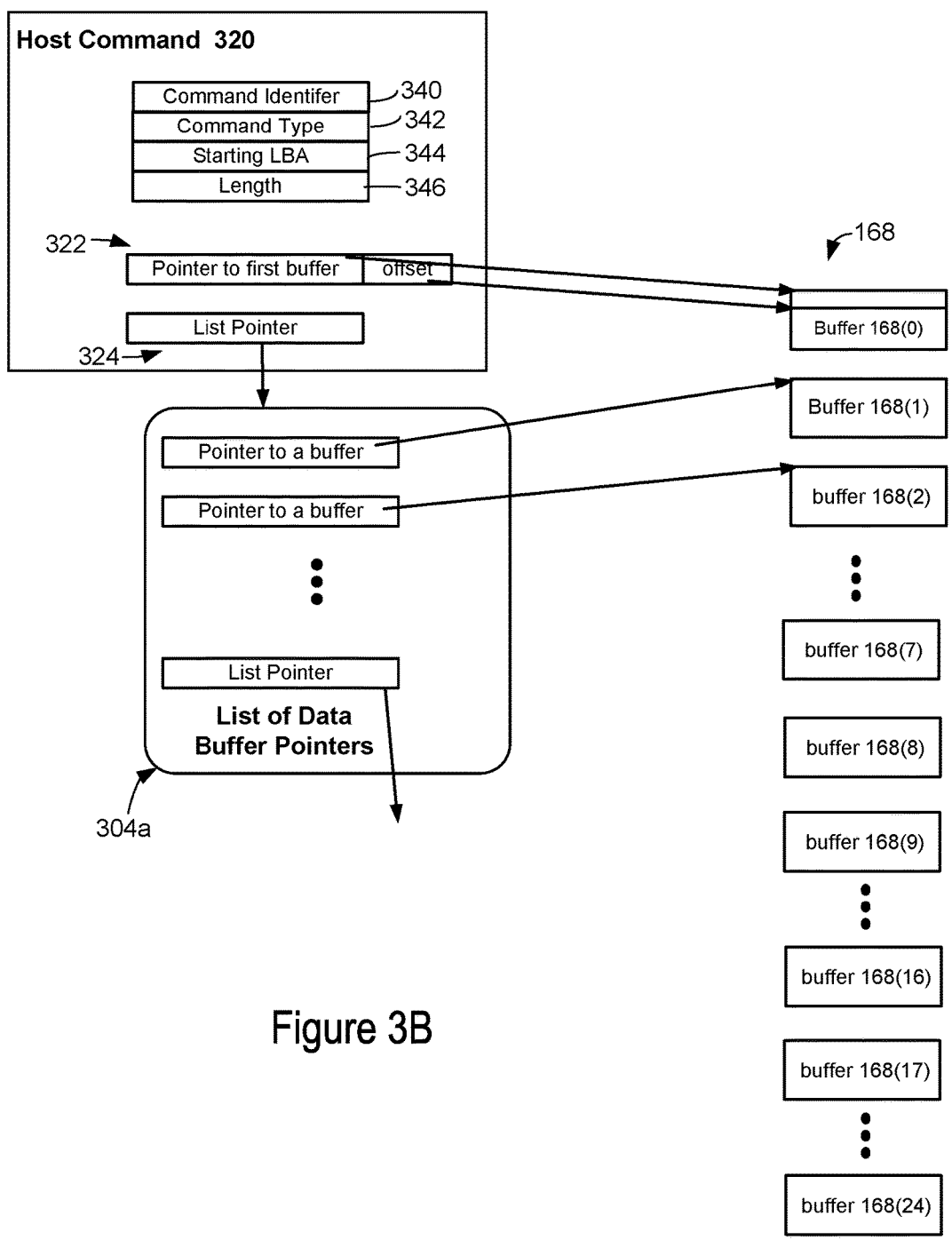
FIG. 3B shows a diagram one example of a host command, host data buffers, and lists of data buffer pointers, in which the first data buffer pointer has a non-zero offset.
Figure 10:
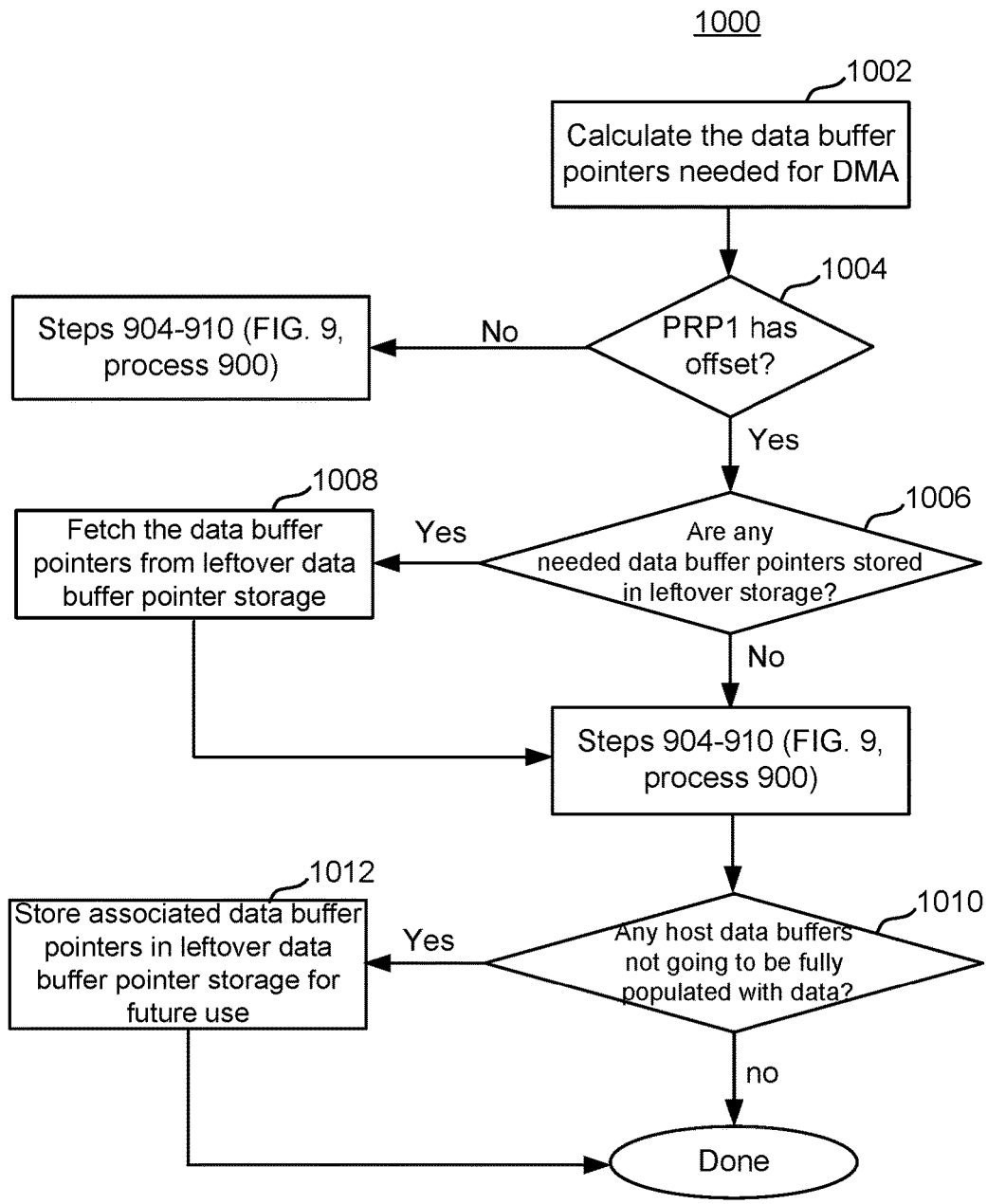
FIG. 10 is a flowchart of one embodiment of a process when the first data buffer pointer has a non-zero offset.

Field 322 contains a pointer to the first data buffer in host memory, in this example. In some embodiments, field 322 has an offset which may be zero or non-zero. The offset maybe used to refine the starting location of the data buffer. FIGS. 3B and 10, and their description, provide further details of one embodiment for processing data buffer pointers when there is a non-zero offset in field 322.

Field 324 contains a pointer to a list of data buffer pointers 304a, in this example. List 304a contains a number of entries. All but the last entry contains a pointer to a data buffer in the host memory. Herein, a pointer to a data buffer in memory of the host system will be referred to as a "data buffer pointer." The last entry in list 304a contains a pointer to list 304b. List 304b contains a number of entries. All but the last entry contains a pointer to a data buffer in the host memory. The last entry in list 304b contains a pointer to another list 304 (not depicted in FIG. 3A). Herein, the term "list pointer" may be used to refer to a pointer to a list that includes data buffer pointers. However, note that the list could also include entries that are not data buffer pointers, such as a pointer to another list. Note that the least entry is not always a pointer to another list 304. The last entry may simply be a pointer to a host data buffer.

In one embodiment, field 322 is a physical region page (PRP) entry as the term is used in NVMe. A physical region page (PRP) entry may be a pointer to a physical memory page in host memory. The PRPs may be used as a scatter/gather mechanism for data transfers between the memory system controller and the host memory. In one embodiment, the size of a physical memory page in host memory is configured by the host system. For example, the host system might specify that each physical memory page is 4 KB, 8 KB, 16 KB, or some other size.

In one embodiment, the PRP entries are a fixed size. In one embodiment, a PRP entry may be a 64-bit (e.g., 8 Byte) physical memory page address. However, the PRP entries could be larger or smaller than 64-bits. A PRP entry may have a page base address and an offset. In one embodiment, the lower bits of a PRP entry indicate an offset within a physical memory page in host memory. For example, if the memory page is 4 KB, then bits 11:02 may form the offset, if the memory page is 8 KB, then bits 12:02 may form the offset, etc.

In one embodiment, field 324 is a pointer to a list of NVMe PRPs. Thus, in one embodiment, lists 304 are PRP lists. As one example, a PRP list could have 512 PRP entries. For example, the PRP list could be 4 KB in size, with 512 PRP entries that are each 64 bits. However, there may be more or fewer PRP entries in a PRP list 304. Also, the PRP list 304 could be larger or smaller than 4 KB. For example, an 8 KB PRP list 304 might contain 1024 entries that are each 64 bits. In one embodiment, the PRP list 304 has a size equal to one single page of contiguous memory in the host memory.

Note that the host command 320 may be associated with more than one list 304 of data buffer pointers. The total number of data buffer pointers that are needed for a command may be implied by the command parameters and the physical memory page size. The last entry in the list 304 may either be a pointer to a data buffer or a pointer to the next list. In the event that the last entry is a pointer to the next list, that entry points to a host memory address that contains the next list 304. Note that the next list 304 may comprise one physical memory page.

In one embodiment, the memory controller 122 is able to determine the location of the last entry in a given list 304 based on the size of one physical memory page. The memory controller 122 is able to determine whether the last entry is a pointer to another list 304 or is a data buffer pointer based on whether more data buffer pointers are needed to satisfy the read or write command, in one embodiment.

There could be a large number of lists 304. For example, a command might be to read 256 MB in the non-volatile storage system. If each data buffer is 4 KB, this might require about 64,000 data buffers—and hence 64,000 list entries. With each list entry being 64 bits, this means that the data buffer pointers could use about 512 KB of storage.

Note that for some read or write commands, field 324 is not used. For example, if a read is for just a one data buffer, then just field 322 might be used. Also, in some cases, there might be just one list 304. Again, this may be the case if there is a relatively small amount of data to be read or written. However, when there are multiple lists, it becomes much more difficult for the memory controller 122 to efficiently manage access of the data buffer pointers from, for example, host memory.

Embodiments disclosed herein fetch data buffer pointers (e.g., NVMe PRP entries) soon enough such that the pointers to the host memory data buffers are available for DMA in a timely manner. Therefore, high data transfer rates between the host and memory system are achieved. However, fetching the data buffer pointers too soon requires considerable storage on the memory device. For example, were all of the data buffer pointers for a command to be fetched when the command is first received by the memory system, this could require substantial storage on the memory device. Hence, embodiments disclosed herein avoid fetching data buffer pointers until just prior to them being needed for DMA to/from the host memory data buffers. Therefore, memory space on the memory system is used efficiently. For example, RAM 122b is used efficiently.

Embodiments disclosed herein fetch data buffer pointers efficiently across the physical interface (e.g., PCIe bus) between the host system and the memory system. In one embodiment, the number of data buffer pointers that are accessed at one time is adapted for efficient transfer over a PCIe bus.

Embodiments disclosed herein fetch data buffer pointers efficiently in a data packet used to transfer data over a physical interface (e.g., PCIe bus) between the host system and the memory system. For example, a PCIe may use a Transaction Layer Packet (TLP). For example, a TLP payload size of 64 Bytes may be optimum efficiency, in some configurations. In this case, the number of data buffer pointers (e.g., NVMe PRPs) that are fetched in one TLP packet may comprise 64 Bytes of data. However, in other configurations, more or fewer than 64 Bytes may be optimum efficiency for a TLP payload size.

In one embodiment, the first data buffer pointer in the command from the host may have an offset. FIG. 3B shows a diagram one example of a host command, host data buffers, and lists of data buffer pointers similar to FIG. 3A. List 304b from FIG. 3A is not depicted so as to simplify the diagram. Also, the pointer to the first data buffer in field 322 in command 320 in FIG. 3B has a non-zero offset. With this offset, the size of the first host buffer is less than the size of other buffers. For example, buffers 168(1) through 168(24) may each be 4 KB. However, the used portion of buffer 168(0) may be less than 4 KB by the size of the offset. Note that a data buffer may be defined by the size of a data buffer (which may be a fixed value specified by the host) and the host memory address to which a data buffer pointer points. For example, the pointers to data buffers 168(1), 168(2), etc. point to the beginning of the data buffer, in one embodiment.

The offset may cause to all transfers between the host system and the memory system to be unaligned. For example, the memory system may want to transfer the first 64 KB. Assuming a 4 KB data buffer, this corresponds to eight complete host data buffers. In this example, the pointer to the first buffer in field 322 is needed for the data transfer as well as the eight data buffer pointers in the first list 304a. These eight data buffer pointers point to data buffers 168(1) to 168(8). However, the last host data buffer (e.g., 168(8)) associated with this example 64 KB transfer will not be fully populated from this 64 KB data due to the offset.

When transferring the 64 KB that follows sequentially in the buffers, the remaining part of data buffer 168(8) may be populated. In order to avoid multiple fetching of data buffer pointers, the leftover data buffer pointer storage (FIG. 7, 714) is used in one embodiment. Leftover data buffer pointer storage 714 is used to store data buffer pointers corresponding to data buffers that were not fully populated. For example, the data buffer pointer to data buffer 168(8) may be stored in leftover data buffer pointer storage 714. In one embodiment, responsive to getting a request for data buffer pointer fetching, the buffer pointer manager 250 first checks if any needed data buffer pointers (e.g., NVMe PRP entries) are stored in the leftover data buffer pointer storage 714. If so, these data buffer pointers need not be fetched from host memory. This provides for a considerable improvement in performance by not having to fetch those data buffer pointers (e.g., PRP entries) again.

Note that in the above scenario, the data buffer pointer that was saved in leftover data buffer pointer storage 714 was at the end of the 64 KB data transfer. Another possibility is to save the data buffer pointer at the beginning of a 64 KB transfer. For example, the memory controller may next perform a 64 KB data transfer that partially fills data buffer 168(16), fully fills data buffers 168(17) to 168(23), and partially fills data buffer 168(24). In this case, the pointers to both data buffer 168(16) and 128(24) may be saved in leftover data buffer pointer storage 714. A later transfer might involve data buffers 168(8) to 168(16) (in which data buffer 168(8) is partially written to and data buffer 168(16) is filled the rest of the way). In this case, the memory controller need not again transfer the pointer to data buffer 168(16). Thus, in this example, the memory controller need not transfer a data buffer pointer to a data buffer at the end of the data transfer.

Also, note in the foregoing, that the need to transfer nine data buffer pointers at a time is avoided. In some embodiment, transfer over the PCIe bus is more efficient when transferring eight data buffer pointers rather than nine data buffer pointers.

Figure 4:
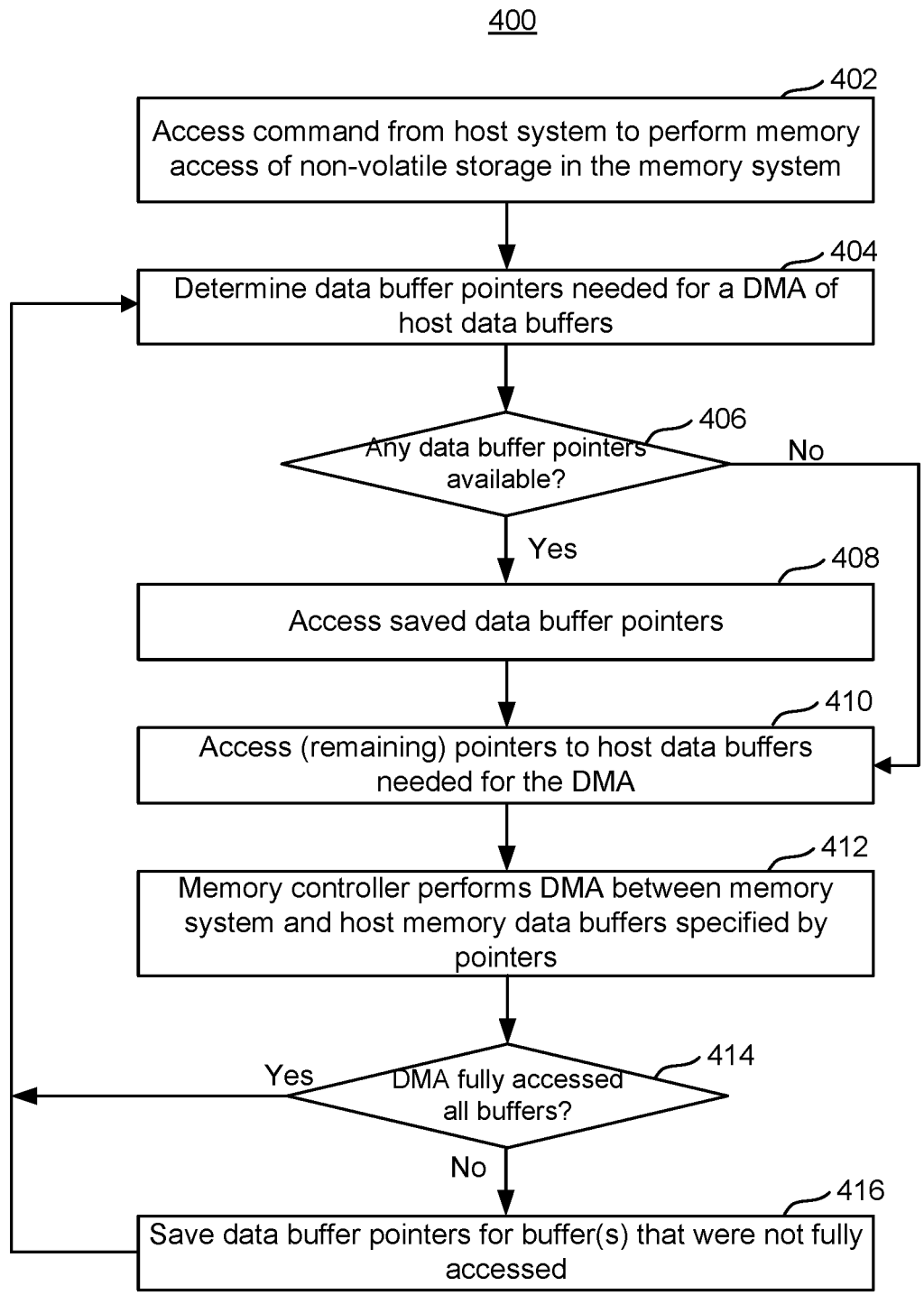
FIG. 4 is a flowchart of one embodiment of a process of operating a non-volatile storage system.

FIG. 4 is a flowchart of one embodiment of a process 400 of operating a non-volatile storage system. The process 400 may be performed by a control circuit in the memory system 100. In one embodiment, a memory controller 122 performs process 400. In one embodiment, the process 400 is performed in an environment such as depicted in FIG. 2A in which the host system 140 contains SQs 162, CQs 164, and data buffer pointers 166. In one embodiment, the process 400 is performed in an environment such as depicted in FIG. 2B in which the memory system 100 contains SQs 162, CQs 164, and data buffer pointers 166. In one embodiment, process 400 is performed in an environment in which the host system 140 contains data buffer pointers 166s, but memory system has SQs 162 and CQs 164. In some embodiments, host system 140 has data buffers 166. In some embodiments, the data buffer pointers 166 are NVMe PRP entries.

In step 402, the memory controller 122 accesses a command from the host system to perform a memory access of non-volatile storage in the memory system 100. The command might be a read operation or a write operation. The command specifies a starting LBA and a length, in one embodiment. Thus, the command may be to read or write at some LBAs (depending on the length). In one embodiment, the memory controller 122 accesses the command from SQs 162 in host memory 160. In one embodiment, the memory controller 122 accesses the command from SQs 162 on the memory system 100 (e.g., storage 264, FIG. 2B). The command has a list pointer, in one embodiment. The list pointer points to a list that includes data buffer pointers to data buffers in the host system.

In step 404, the memory controller 122 determines what data buffer pointers are needed for a DMA of host system data buffers. It is possible that some of these data buffer pointers were saved from a prior DMA. In one embodiment, it is possible that a data buffer pointer at the beginning and/or the end of a prior DMA was saved.

In step 406, the memory controller 122 determines whether any of the needed data buffer pointers are presently stored in the memory system. For example, the memory controller 122 determines whether any of the any of the needed data buffer pointers were saved in command context storage 242. If so, the memory controller 122 accesses the saved data buffer pointer or pointers, in step 408. Note that this alleviates the need to access this data buffer pointer over, for example, a PCIe bus. This can provide considerably more efficient operation.

In step 410, the memory controller 122 accesses data buffer pointers to host data buffers for the DMA. This step may fetch all of the data buffer pointers for the DMA in the event that none were saved from a prior DMA. This may fetch the remaining data buffer pointers needed for the DMA in the event there is one or more saved from a prior DMA.

In one embodiment, memory controller 122 accesses just the data buffer pointers that are need for the DMA. For example, if the DMA needs eight data buffer pointers, then the memory controller may fetch just those eight data buffer pointers. The memory controller 122 may base this fetch on the list pointer in the command. However, note that the command may be associated with multiple lists of data buffer pointers. In one embodiment, the memory controller uses the list pointer in the command to locate another list pointer in, for example, host memory.

In one embodiment, the memory controller 122 fetches the data buffer pointers in step 410 from host memory 160. In one embodiment, the memory controller 122 fetches the data buffer pointers in step 410 from storage 264 (see FIG. 2B).

Step 412 is for the memory controller 122 to perform the DMA between the memory system 100 and the host memory data buffers specified by the data buffer pointers. The DMA is from a read buffer in memory system 100 to a data buffer in host memory, in one embodiment. The DMA is from a data buffer in host memory to a write buffer in memory system 100, in one embodiment.

Step 414 is a determination of whether the DMA fully accessed all data buffers. For example, for a read operation, the DMA might have only partially filled one or more of the data buffers. As one example, a data buffer might be 4 KB. The DMA might have written less than 4 KB of data to one of the data buffers. For a write operation, the DMA might have accessed data from just a portion of one or more of the data buffers. In this case, the DMA might have read less than 4 KB for one of the data buffers. For other data buffers (that were fully accessed), 4 KB may have been written or read.

If there is a buffer that was not fully accessed, then the data buffer pointer for that data buffer is saved in, for example, command context storage 242. The process 400 then returns to step 404 to process another DMA.

Figure 5:
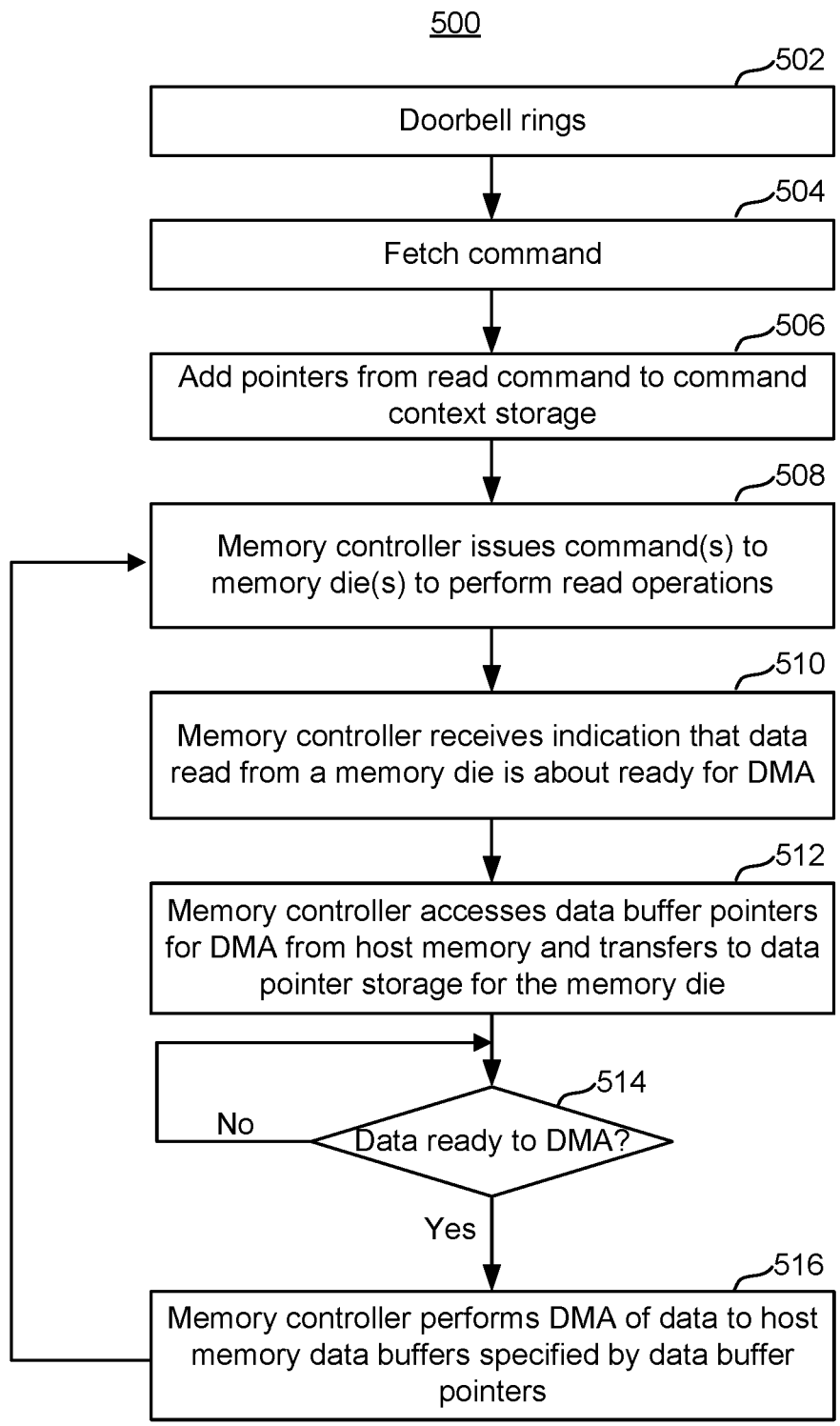
FIG. 5 is a flowchart of one embodiment of a process of performing a DMA from a memory system to a host system for a read command.

FIG. 5 is a flowchart of one embodiment of a process 500 of performing a DMA from a memory system to a host system for a read command. This process 500 assumes that the command is associated with multiple lists of data buffer pointers (e.g., multiple NVMe PRP lists). Process 500 will be discussed with respect to the example command 320 of FIG. 3A or 3B, but is not limited thereto.

In step 502, a "doorbell" rings. The doorbell is a mechanism by which the host system informs the memory system that a new command is ready on a submission queue (SQ) 162. In one embodiment, the memory controller 122 has a doorbell register, which the host system writes to "ring the doorbell."

In step 504, the memory controller 122 fetches the new command from the SQ 162 in response to the doorbell. In one embodiment, memory controller 122 accesses the new command from host memory 160 (e.g., command queue 162, FIG. 2A). In one embodiment, memory controller 122 accesses the new command from RAM in the memory system (e.g., SQs 162 in storage 264, FIG. 2A).

In step 506, the memory controller 122 adds the data pointer in the field 322 to command context storage for this command. Note that this is a pointer to a data buffer in this example. The memory controller 122 also adds the list pointer in the field 324 to command context storage for this command.

Note that command parser 248 may parse the command to determine how the data buffer pointers (e.g., NVMe PRP entries) should be processed based on field 324. For example, if field 324 is not a list pointer, then data buffer pointer processing need not use process 500.

Step 508 is for the memory controller 122 to issue commands to memory due to perform read operations. Note that this assumes that the read command from the host involves physical locations on multiple memory dies. It is not required that the read involve multiple memory die, in which case the memory controller may issue a read command to one memory die.

Step 510 includes the memory controller 122 receiving an indication that data read from one of the memory dies is about ready for a DMA. However, note that this is not necessarily the raw data from the memory die. Typically, error correction is performed by ECC 224. Also, other steps may be taken such a decryption or encryption. Thus, the data that was read from the memory die may go through a pipeline in the memory controller prior to it being placed in the read buffer for transfer to the host system.

In one embodiment, the DMA is for a pre-determined number of host data buffers. For example, the DMA may be for eight host data buffers. As one example, each host data buffer is 4K bytes, hence, this may be for a DMA of 32K bytes.

Step 512 includes the memory controller accessing data buffer pointers (e.g., NVMe PRPs) for this portion of the read. These data buffer pointers may be stored in the data buffer pointers storage 252 for the memory die from which the data was read.

Step 514 is to wait until the data is ready to be DMAd. In one embodiment, the data is ready to be DMAd when it is placed into a read buffer in RAM 122b of the memory system 100. As noted above, the data may go through a pipeline in the memory controller prior to being placed into the read buffer for transfer to the host system.

In step 516, the memory controller uses the data buffer pointers to perform a DMA of the data from the memory controller to the host data buffers.

In one embodiment, the memory controller takes advantage of a short delay between the indication of step 510 and the data being ready for transfer in step 514 to fetch the data buffer pointers in step 512. The delay may be readily calculated, or at least estimated, based on factors such as how long it typically takes from issuing the read command to the memory die until the memory die sends data to the memory controller, how long it typically takes the memory controller to process the data (e.g., ECC, encryption/decryption, etc.), as well as how long it typically takes to fetch the data buffer pointers from host memory (or alternatively storage 264). The memory controller 122 times the fetch such that the data buffer pointers are ready for the DMA by the time the data is ready for transfer to the host data buffers. Thus, the data buffer pointers may be provided "just-in-time."

However, the memory controller 122 avoids fetching data buffer pointers (e.g., NVMe PRPs) so early that memory space is wasted holding data buffer pointers that are not yet needed for a DMA. Also, the memory controller 122 avoids fetching a data buffer pointers (e.g., NVMe PRPs) more than once, in embodiments. This may be because the memory controller 122 does not fetch the data buffer pointers until it is known that a DMA is ready, in one embodiment. In contrast, some techniques that may fetch a larger number of data buffer pointers whether they are needed or not may end up overwriting a data buffer pointer, and thus needing to fetch that data buffer pointer again. This not only wastes memory space on the memory system, but also wastes transmission bandwidth of the data bus between the memory system and host. In contrast, some embodiments discussed herein use the bus bandwidth efficiently by only transferring each data buffer pointer (e.g., each NVMe PRP) once over the bus.

Figure 6:
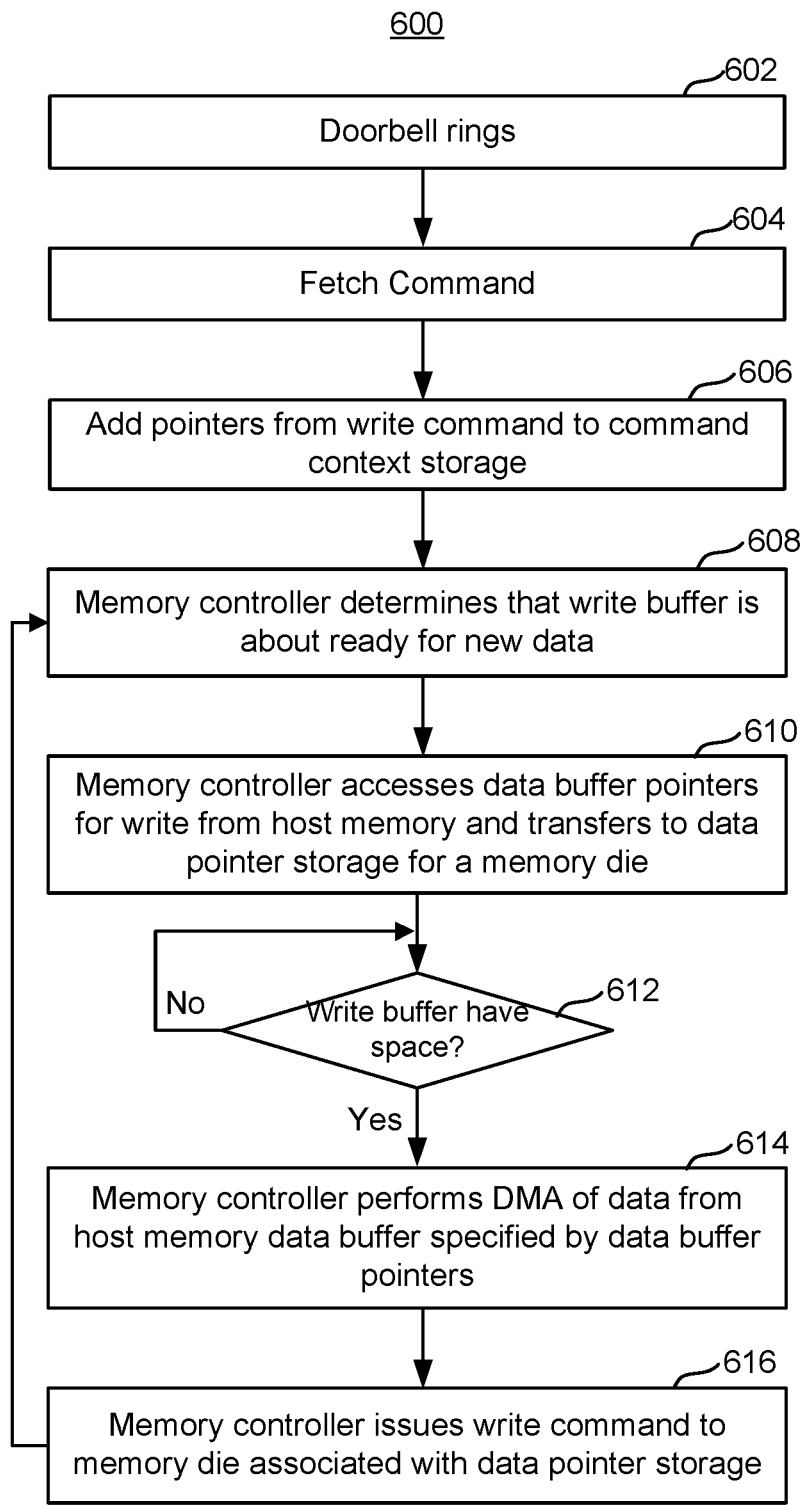
FIG. 6 is a flowchart of one embodiment of a process of performing a DMA from a memory system to a host system for a write command.

FIG. 6 is a flowchart of one embodiment of a process 600 of performing a DMA from a memory system to a host system for a write command. This process 600 assumes that the command is associated with multiple lists of data buffer pointers (e.g., multiple NVMe PRP lists). Process 600 will be discussed with respect to the example command 320 of FIG. 3A or 3B, but is not limited thereto.

In step 602, a "doorbell" rings. In step 604, the memory controller 122 fetches the new command from the SQ 162 in response to the doorbell. In step 606, the memory controller 122 adds the data pointer in the field 322 to command context storage for this command. Steps 602, 604 and 606 may be similar to steps 502, 504, and 506, respectively, of process 500.

In step 608, the memory controller 122 determines that a write buffer is about ready for new data. This write buffer is a buffer in the memory system 100 that is used to store data to be written to a memory die 108, in one embodiment. The write buffer may be used to store data that is accessed from data buffers in host memory 160.

Step 610 includes the memory controller accessing data buffer pointers (e.g., NVMe PRPs) for a portion of the write. For example, the memory controller may determine what data buffer pointers are needed for some 32K byte portion of the data to be written. These data buffer pointers may be stored in the data buffer pointers storage 252 for the memory die for which the data is to be written.

Step 612 is a determination of whether the write buffer has space for the data to be transferred from the host data buffers. If not, the process waits. When sufficient space is available, the process continues at step 614.

In step 614, the memory controller uses the data buffer pointers to perform a DMA of the data from the host data buffers to the write buffer.

In step 616, the memory controller issues a command to the memory die to which the data is to be written to perform a write operation. The process 600 may then return to step 608, which indicates that the memory controller again determines that the write buffer is about ready for new data.

In one embodiment, the memory controller takes advantage of a short delay between the indication of step 608 and the write buffer being ready in step 612 to fetch the data buffer pointers in step 610.

FIG. 7 is a diagram of one embodiment of command context storage 242, ring buffers 752, buffer pointer manager 250, and host memory 160. The ring buffers 752 are one embodiment of data buffer pointer storage 252.

There may be one command context storage 242(1) to 242(n) for each outstanding read or write command, in one embodiment. Command context storage has field 702, which may be used to store a data buffer pointer from the host command. In one embodiment, field 702 is used to store the value from field 322 in command 320 of the example of FIG. 3. In FIG. 7, this value is referred to as PRP1, and is a data buffer pointer referred to as, "data_ptr0". This may be the first in a sequence of data buffers in host memory.

Field 704 may be used to store a list pointer from the command 320. In one embodiment, field 704 is used to store the value from field 324 in command 320 of the example of FIG. 3. In FIG. 7, this value is referred to as PRP2, and is a list pointer referred to as, "list_ptr0." Note that this points to the first list 304(1) of data buffer pointers in host memory 160.

PRPTR_A 706 may be used to store a pointer to a list of data buffer pointers (e.g., a list of NVMe PRPs). PPTR_A_INDEX 708 is an index for the pointer stored in PRPTR_A 706. The index is an integer from zero upwards that indicates which list 304 is being pointed to. A value of zero may be used to indicate that the value in PRPTR_A 706 does not point to any list. As noted the command may be associated with a number of lists of data buffer pointers 304. These lists 304 may be numbered based on their host memory addresses.

PRPTR_B 710 may be used to store a pointer to a list of PRPs. PPTR_B_INDEX 712 is an index for the pointer stored in PRPTR_B 710. The index is an integer from zero upwards that indicates which list 304 is being pointed to. A value of zero may be used to indicate that the value in PRPTR_B 710 does not point to any list.

Leftover data pointer buffers 714 may store a value that is relevant when the first data buffer pointer in field 702 has an offset. FIG. 10 provides further details for one embodiment that uses leftover data pointer buffers 714. In one embodiment, leftover data pointer buffers 714 stores leftover NVMe PRP entries.

The host memory 160 includes multiple lists 304 of data buffer pointers (e.g., NVMe PRPs). In this example, there is list 304(1) and 304(2). The value "1", or "2" associated with the list 304 refers to an index. There may be many more lists 304, each with their own index.

There is one ring buffer 752 for each memory die in one embodiment. The ring buffers 752 each store data buffer pointers. In one embodiment, the ring buffers 752 store NVMe PRPs. The ring buffers 252(1)-252(m) are each a circular (ring) buffer, in one embodiment. In one embodiment, the data that is read from a give memory die is transferred to host data buffers in order. By "in order" it is meant in the order of the pointers in the ring buffer of a given memory die. However, the data from different memory dies is not necessarily transferred in order with respect to other memory dies. For example, the memory system 100 may perform a DMA to a data buffer pointed to be data_ptrN prior to performing a DMA to a data buffer pointed to be data_prt2 (both in list 304(1)), if these two data pointers are associated with data read from two different memory dies. Thus, the buffer pointer manager 250 may be configured to perform DMAs with respect to a ring buffer of given memory die out of order with respect to ring buffers of other memory dies.

The buffer pointer manager 250 is configured to access list pointers from command context storage 242 and use those to access data pointers and other list pointers from host memory 160. The buffer pointer manager 250 is configured to transfer the data buffer pointers to an appropriate ring buffer 252. For example, the buffer pointer manager 250 is configured to transfer the data pointers the ring buffer 252 associated with a memory die that is to perform a read or write associated with those data pointers. The buffer pointer manager 250 is configured to transfer new list pointers to command context storage.

Figure 8:
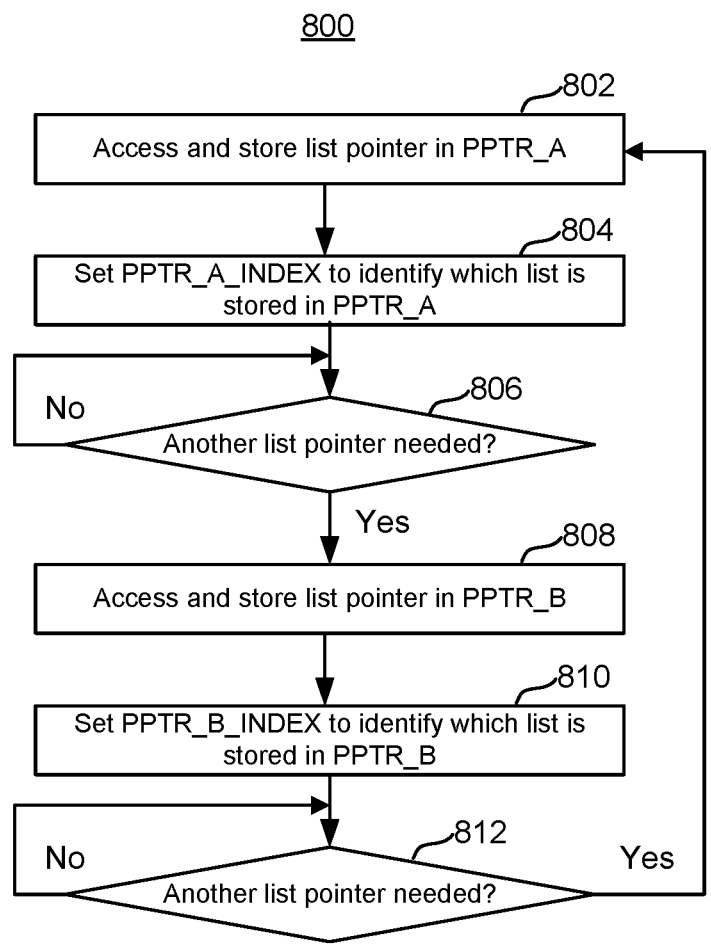
FIG. 8 is a flowchart of one embodiment of a process of managing list pointers.

FIG. 8 is a flowchart of one embodiment of a process 800 of managing list pointers. This process 800 may be used with one embodiment of context storage of FIG. 7, but is not limited thereto. The process 800 begins when a new command from the host system 140 is being processed by the memory controller. In one embodiment, memory controller 122 performs process 800 when it receives a command that has multiple lists of data buffer pointers associated therewith. For example, memory controller 122 may perform process 800 when it receives a command that has multiple NVMe PRP lists associated therewith.

In step 802, the memory controller 122 stores a list pointer in PPTR_A 706. In addition, the memory controller may store pointers in fields 702 and 704. Referring to the example of FIG. 3, the pointer to the first buffer from field 322 may be stored in field 702, and the list pointer from field 324 may be stored in field 704. The list pointer from field 324 may also be stored in PPTR_A 706.

Step 804 includes setting PPTR_A_INDEX to identify which list 304 is stored in PPTR_A 706. Referring to the example of FIG. 7, initially PPTR_A_INDEX may be set to "1" to indicate the PPTR_A 706 points to list 304(1). Note that at this time PPTR_B_INDEX may be set to "0" to indicate that PPTR_B 710 does not contain a valid list pointer.

At some point in processing the command, there may be a need for a data buffer pointer (e.g., NVMe PRP entry) in a list 304 for which the memory system does not have a list pointer. In other words, the memory system does not have a list pointer to a certain list 304. This may be because none of fields 704, 706 or 710 has such as a list pointer. When this occurs (step 806=yes), then the memory controller may access a new list pointer and store it PPTR_B 710. The memory controller 122 may determine what data buffer pointers (e.g., NVMe PRP entries) are needed as follows. Referring to the example of FIG. 7, the first list 304(1) contains a number of data pointers (data_ptr1-data_ptrN). The memory controller 122 may determine that the needed data buffer pointers are not somewhere in list 304(1). To do so, the memory controller 122 knows how many data buffer pointers are on the list 304(1) and how many logical blocks are associated with the list. In one embodiment, each data buffer pointer is associated with one logical block. Hence, the memory controller may determine what range of logical blocks correspond to the list 304(1). This is just one example for determining whether the needed data buffer pointers are in list 304(1).

For the sake of discussion, the memory controller 122 determines that data buffer pointers that are within list 304(2) are needed for a DMA. The memory controller accesses list_ptr1 from the end of list 304(1). Note that list_ptr1 points to list 304(2). Thus, list_ptr1 may be stored in PPTR_B 710. In one embodiment, the list pointer is accessed from host memory (e.g., from data buffer pointers 166 in host memory 160, FIG. 2A. In one embodiment, the list pointer is accessed from storage 264 (e.g., from data buffer pointers 166 in storage 264, FIG. 2B).

Also, in step 810, the index "2" may be stored in PPTR_B_INDEX 712 to identify that list pointer stored in PPTR_B 710 points to list 304(2). Note that PPTR_B 710 could point to some other list, in which case PPTR_B_INDEX 712 is set to the relative index for that list 304.

At some point another list pointer may be needed for a DMA. When the memory controller determines one is needed (step 812=yes), the process 800 returns to step 802. This time the list pointer that is stored in PPTR_A 706 is overwritten with a new list pointer. For example, the memory controller might store list_ptr2 from the end of list 304(2) in PPTR_A 706. In this case, the memory controller may store the index "3" in PPTR_A_INDEX 708 to indicate which PRP list is pointed to by PPTR_A 706.

The process 800 may continue on to use PPTR_A 706 and PPTR_B 710 as "ping-pong" buffers in which oldest list pointer is overwritten when a new list pointer is needed for a DMA.

Note that it is not required that the lists 304 be used sequentially. Rather, it is possible that a list 304 that skips an index might be needed next. Also, note that more or fewer than two list pointers can be stored in the command context for one command. For example, there might be a PPTR_C and a PPTR_C_INDEX for a third list pointer. Also, in one embodiment, PPTR_B_INDEX 712 and PPTR_B 710 are not required.

Figure 9:
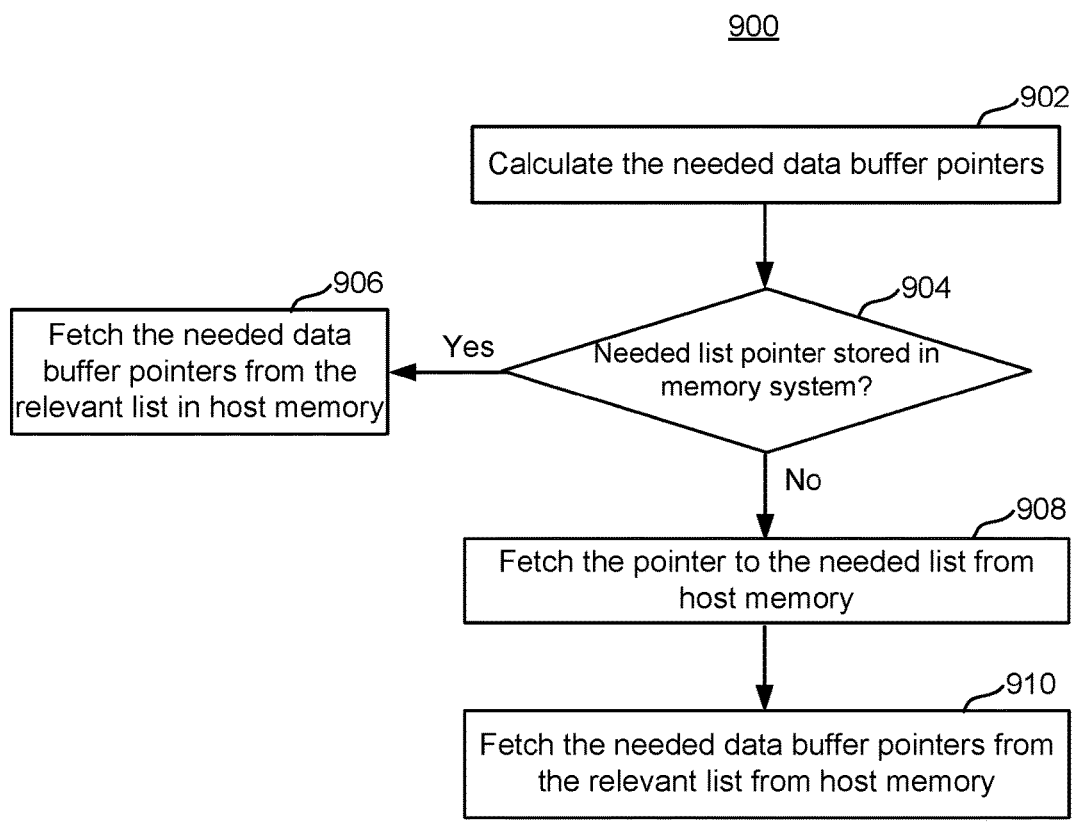
FIG. 9 is a flowchart of one embodiment of a process of accessing data buffer pointers.

FIG. 9 is a flowchart of one embodiment of a process 900 of accessing data buffer pointers. Process 900 is one embodiment of step 410 of process 400. In one embodiment, process 900 is used to access NVMe PRP entries. In one embodiment, the data buffer pointers are accessed from host memory (e.g., from data buffer pointers 166 in host memory 160, FIG. 2A). In one embodiment, the data buffer pointers are accessed from storage 264 (e.g., from data buffer pointers 166 in storage 264, FIG. 2B).

In step 902, the memory controller calculates what data buffer pointers (e.g., NVMe PRP entries) are needed for a DMA. In one embodiment, the memory controller makes this calculation based on logical addresses of the host. The memory controller may convert between logical addresses that the host system uses to physical addresses in the non-volatile storage. Thus when, for example, the memory controller is about to transfer some unit of data that was read from certain physical addresses, the memory controller may convert those physical addresses to logical addresses. Recall that a starting logical address may be specified in read command from the host system. Also recall that data buffer pointers may be of a certain size (e.g., 64 bits) and that each data buffer may be of a certain size (e.g., 4 KB). With this information, the memory controller is able to determine how far into the lists of data buffer pointers the needed data buffer pointers (for the LBA) exist.

In step 904, the memory controller determines whether a list pointer associated with the needed data buffer pointers is stored in the memory system 100. In one embodiment, the buffer pointer manager 250 determines whether field 706 or 710 contains the needed list pointer. In one embodiment, the buffer pointer manager 250 calculates what the index is for the needed list 304. In other words, the buffer pointer manager 250 calculates whether the needed data buffer pointers are in the first list 304(1), second list 304(2), third list, fourth list, etc. The buffer pointer manager 250 may simply examine fields 708 and 712 to determine whether either field 708 or 712 contains the index of the needed list.

If the needed list pointer is already stored in memory system 100, then the memory controller may use this list pointer to fetch the needed data buffer pointers from the relevant list in host memory. For example, the memory controller may use either PPTR_A from field 706 or PPTR_B from field 710 to determine the starting location of the list 304. Then, the memory controller determines how far into this list the needed data buffer pointers exist.

The memory controller accesses just the needed data buffer pointers from the list, in one embodiment. For example, it may be that only eight data buffer pointers out of a list of 512 data buffer pointers are needed. In one embodiment, the memory controller accesses the needed data buffer pointers by obtaining a single Transaction Layer Packet (TLP) packet over a PCIe bus. Thus, the needed data buffer pointers may be obtained very efficiently with respect to the PCIe bus usage. Note that the number of data buffer pointers that are obtained may be optimized for efficient transfer over the PCIe bus. In some cases, more or fewer than eight data buffer pointers may result in more efficient usage of the PCIe bus.

The data buffer pointers that are fetched may be stored into the appropriate ring buffer 752, in one embodiment. For example, the data buffer pointers may be associated with a read operation of a certain memory die. Thus, the data buffer pointers may be placed into a ring buffer for that memory die.

If the needed list pointer is not already stored in memory system 100 (step 904=no), then the memory controller fetches the needed list pointer from the relevant list in host memory in step 908. For example, the memory controller may use either PPTR_A from field 706 or PPTR_B from field 710 to determine the starting location of one of the lists 304. [Note that in this example, neither PPTR_A nor PPTR_B is the needed list pointer.] Then, the memory controller may determine how far away from the start of that list the needed list pointer exists. Referring to FIG. 7, as one example, let us say that the needed list pointer is list_ptr2 at the end of list 304(2). In this case, the memory controller may determine the location of list_ptr2 based on the start of list 304(2) and the length of list 304(2). Note that the memory controller may overwrite the list pointer in either field 706 or field 710 with the new list pointer.

In step 910, the memory controller fetches the needed data buffer pointers from the relevant list in host memory. This step may be similar to step 906 now that the needed list pointer is now available.

FIG. 10 is a flowchart of one embodiment of a process 1000 of managing data buffer pointers when the first data buffer pointer has a non-zero offset. FIG. 10 provides further details of one embodiment of process 400. In FIG. 10, the example is of a read command. However, the process may be modified for a write command. The command context 242 of FIG. 7 may be used in process 1000, but process 1000 is not limited to that example. In one embodiment, process 1000 is performed by the memory controller in FIG. 2A. In one embodiment, process 1000 is performed by the memory controller in FIG. 2B. However, process 1000 is not limited to either FIG. 2A or 2B.

In step 1002, the memory controller determines the data buffer pointers (e.g., NVMe PRP entries) that are needed for a given DMA. This could be, for example, a 64 KB DMA. However, the DMA could be for some other size. This might be a write or a read.

In step 1004, the memory controller determines whether PRP1 has a non-zero offset. For example, the buffer pointer manager 250 may determine whether "data_ptr0" in field 702 of command context storage 242 has a non-zero offset. The offset may be located in a certain range of bits in this field 702.

If there is not a non-zero offset (step 1004=no), then processing may continue as in steps 904-910 in process 900. If there is a non-zero offset (step 1004=yes), then processing may continue at step 1006. Note that a non-zero offset example is depicted in FIG. 3B. In step 1006, the memory controller determines whether any required data buffer pointers (e.g., NVMe PRP entries) are stored in leftover data buffer pointer storage 714. For example, these might be the first and/or the last data buffer pointers for the data transfer as mentioned in the examples above.

If any of the required data buffer pointers are in leftover data buffer pointer storage 714, then those data buffer pointers are accessed from leftover data buffer pointer storage 714, in step 1008. Those data buffer pointers may be transferred to the appropriate ring buffer, in one embodiment. Also, the data buffer pointers that were accessed from leftover data buffer pointer storage 714 may be discarded from leftover data buffer pointer storage 714. This saves memory space, as these data buffer pointers will not be needed again, in one embodiment. Herein, "to discard" a data buffer pointer means to allow the memory space in which it is/was stored to be freed, such that the space may be used for another data buffer pointer. This may be accomplished by marking the memory space as available for another data buffer pointer. This does not require a physical change to the memory space. For example, at some later point in time, the data buffer pointer that was discarded may be overwritten. The memory controller may note which memory locations have presently valid (undiscarded) data buffer pointer and which memory locations in leftover data buffer pointer storage 714 are free. Then, processing may continue as in steps 904-910 in process 900 in order to obtain the other data buffer pointers for this data transfer.

If none of the required data buffer pointers are in leftover data buffer pointer storage 714, then processing may continue as in steps 904-910 in process 900 in order to obtain all of the buffer pointers for this data transfer.

In step 1010, the memory controller determines whether there are any host data buffers that are not going to be fully populated after the data transfer. For example, it may be that the first and/or the last host data buffer is not going to be fully populated after the data transfer. If so, then in step 1012, the data buffer pointers associated with those not fully populated data buffers are stored in leftover data buffer pointer storage 714. By fully populated it is meant that the entire, for example, 4 KB data buffer will have data written thereto. The data buffer could be another size.

If all host data buffers are to be fully populated, then the process may end without saving any data buffer pointers in leftover data buffer pointer storage 714. Also, in the event step 1012 is performed, whatever data buffer pointers correspond to data buffers that were fully populated are not saved in leftover data buffer pointer storage 714.

After the DMA is performed, all of the data buffer pointers involved in the DMA may be in a ring buffer 752. In one embodiment, the buffer pointer manager 250 determines that the data buffer pointers in the ring buffer 752 that were involved in the DMA may now be overwritten. Thus, after the DMA, the data buffer pointers in the ring buffer 752 may be lost regardless of whether step 1012 was performed.

One embodiment disclosed herein includes a non-volatile storage system, comprising a plurality of non-volatile memory cells, command context storage, and a control circuit in communication with the command context storage and the plurality of non-volatile memory cells. The control circuit is configured to access a command from a host system to access non-volatile memory cells in the non-volatile storage system. The command comprises a list pointer to a list comprising data buffer pointers to data buffers in the host system. The control circuit is configured to fetch a data buffer pointer to a data buffer of the host system based on the list pointer. The control circuit is configured to perform a first DMA between the non-volatile storage system and the data buffer in the host system pointed to by the fetched data buffer pointer. The control circuit is configured to save the data buffer pointer into the command context storage responsive to the first DMA not accessing the entire data buffer. The control circuit is configured to access the saved data buffer pointer. The control circuit is configured to use the saved data pointer to perform a second DMA to access a portion of the host data buffer pointed to by the data buffer pointer that the first DMA did not access.

One embodiment disclosed herein includes a method of operating a non-volatile storage system. The method comprises accessing a command from a host system to read data stored in the non-volatile storage system. The command comprises a first field having a data buffer pointer to a data buffer and a non-zero offset into the data buffer and a second field having a list pointer to a list of data buffer pointers to data buffers in the host system. The method comprises fetching data buffer pointers to data buffers of the host system to be used for direct memory accesses (DMAs) with respect to a read or a write operation of non-volatile memory cells in the non-volatile storage system. The data buffer pointers are fetched from the host system. The method comprises, responsive to a first DMA of the DMAs not accessing an entire host data buffer pointed to by the first data buffer pointer, storing, in the non-volatile storage system, a first of the data buffer pointers that were used for the DMAs. The method comprises, responsive to a determination that a second DMA for a different read or write operation is to access a portion of the host data buffer pointed to by the first data buffer pointer that the first DMA did not access, accessing the first data buffer pointer that is stored in the non-volatile storage system. The method comprises using the stored first data buffer pointer for the second DMA to access the portion of the host data buffer pointed to the first data buffer pointer that the first DMA did not access.

One embodiment disclosed herein includes non-volatile storage system, comprising a plurality of memory dies of non-volatile memory cells. The non-volatile storage system comprises means for accessing a command from a host system to access the non-volatile memory cells. The non-volatile storage system comprises means for parsing the command to determine whether the command has a first field having a pointer to a data buffer and a non-zero offset into the data buffer and a second field having a list pointer to a list of data buffer pointers to data buffers in a host system. The non-volatile storage system comprises means for initiating memory array operation of non-volatile memory cells in a memory die in the non-volatile storage system responsive to the command. The non-volatile storage system comprises means for fetching data buffer pointers to data buffers of the host system to be used for direct memory accesses (DMAs) with respect to the memory array operation. The non-volatile storage system comprises means for using the fetched data buffer pointers to perform the DMAs of memory in the host system. The non-volatile storage system comprises means for saving, in the non-volatile storage system, a first of the data buffer pointers that were used for the DMAs responsive to a first DMA of the DMAs not accessing an entire host data buffer pointed to by the first data buffer pointer. The non-volatile storage system comprises means for accessing the first data buffer pointer that is saved in the non-volatile storage system responsive to a determination that a second DMA for a different memory array operation is to access a portion of the host data buffer pointed to by the first data buffer pointer. The non-volatile storage system comprises means for using the saved first data buffer pointer for the second DMA to access the portion of the host data buffer pointed to by the first data buffer pointer that the first DMA did not access.

In one embodiment, means for accessing a command from a host system to access the non-volatile memory cells includes one or more of controller 122, processor 122c, front end module 208, command fetcher 246, and/or other hardware and/or software.

In one embodiment, means for parsing the command to determine whether the command has a first field having a pointer to a data buffer and a non-zero offset into the data buffer and a second field having a list pointer to a list of data buffer pointers to data buffers in a host system includes one or more of controller 122, processor 122c, command parser 248, command fetcher 246, and/or other hardware and/or software.

In one embodiment, means for initiating memory array operation of non-volatile memory cells in a memory die in the non-volatile storage system responsive to the command includes one or more of controller 122, processor 122c, back end module 210, command scheduler 226, command executor 228, and/or other hardware and/or software.

In one embodiment, means for fetching data buffer pointers to data buffers of the host system to be used for direct memory accesses (DMAs) with respect to the memory array operation includes one or more of controller 122, processor 122c, front end module 208, buffer pointer manager 250, and/or other hardware and/or software.

In one embodiment, means for using the fetched data buffer pointers to perform the DMAs of memory in the host system includes one or more of controller 122, processor 122c, DMA 253, buffer pointer manager 250, and/or other hardware and/or software.

In one embodiment, means for saving, in the non-volatile storage system, a first of the data buffer pointers that were used for the DMAs responsive to a first DMA of the DMAs not accessing an entire host data buffer pointed to by the first data buffer pointer includes one or more of controller 122, processor 122c, DMA 253, buffer pointer manager 250, and/or other hardware and/or software.

In one embodiment, means for accessing the first data buffer pointer that is saved in the non-volatile storage system responsive to a determination that a second DMA for a different memory array operation is to access a portion of the host data buffer pointed to by the first data buffer pointer includes one or more of controller 122, processor 122c, DMA 253, buffer pointer manager 250, and/or other hardware and/or software.

In one embodiment, means for using the saved first data buffer pointer for the second DMA to access the portion of the host data buffer pointed to by the first data buffer pointer that the first DMA did not access includes one or more of controller 122, processor 122c, DMA 253, buffer pointer manager 250, and/or other hardware and/or software.

Corresponding methods, systems and computer- or processor-readable storage devices which have executable code for performing the methods provided herein may also be provided.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

I claim:

1. A non-volatile storage system, comprising:
   a plurality of non-volatile memory cells;
   command context storage; and
   a control circuit in communication with the command context storage and the plurality of non-volatile memory cells, the control circuit configured to:
   access a command from a host system to access non-volatile memory cells in the non-volatile storage system, the command comprising a first list pointer to a first list comprising data buffer pointers to data buffers in the host system;

store, in the command context storage, the first list pointer;

store, in the command context storage, a second list pointer to a second list of data buffer pointers in the host system;

responsive to a determination that a data buffer pointer to be used for a direct memory access (DMA) to respond to the command is within either the first list or the second list, use either the first list pointer or the second list pointer to fetch the data buffer pointer;

responsive to a determination that the data buffer pointer is not within either the first list or the second list, fetch a third list pointer from host system memory and use the third list pointer to fetch the data buffer pointer; and perform a direct memory access (DMA) between the non-volatile storage system and the data buffer in the host system pointed to by the fetched data buffer pointer.

2. The non-volatile storage system of claim 1, wherein the control circuit is further configured to:

store the third list pointer in the command context storage, wherein the third list pointer overwrites either the first list pointer or the second list pointer; and store an index of the third list pointer in the command context storage.

3. The non-volatile storage system of claim 1, further comprising:

a separate data buffer pointer storage for each of a plurality of memory dies in the non-volatile storage system, wherein the control circuit is further configured to store data buffer pointers to host system data buffers in the respective data buffer pointer storages for the plurality of memory dies.

4. The non-volatile storage system of claim 3, wherein the control circuit is further configured to perform DMAs with respect to a data buffer pointer storage of a given memory die out of order with respect to data buffer pointer storage of other memory dies.

5. The non-volatile storage system of claim 1, wherein the data buffer pointer is a physical region page (PRP) pointer in a non-volatile memory express (NVMe) interface.

6. The non-volatile storage system of claim 1, wherein:

the control circuit is configured to fetch the data buffer pointer along with other data buffer pointers to host system data buffers over a Peripheral Computer Interface Express (PCIe) bus;

the command is associated with multiple lists of data buffer pointers in memory of the host system; and the control circuit is further configured to fetch only data buffer pointers that fit in a single Transaction Layer Packet (TLP) packet over the PCIe bus.

7. The non-volatile storage system of claim 1, wherein:
the command is a read command; and
the control circuit is further configured to fetch the data buffer pointer after the control circuit issues a read operation to a memory die in the non-volatile storage system to satisfy the read command but prior to data read from the memory die in response to the read operation being ready to transfer to the host system.

8. The non-volatile storage system of claim 1, wherein the control circuit is further configured to discard the data buffer pointer responsive to a determination that, the DMA accessed the entire host data buffer pointed to by the data buffer pointer.

9. The non-volatile storage system of claim 1, wherein the control circuit is further configured to fetch the data buffer pointer from host system memory.

10. The non-volatile storage system of claim 1, further comprising:

a memory controller; and a storage unit coupled to the memory controller, wherein the control circuit is further configured to fetch the data buffer pointer from the storage unit coupled to the memory controller.

11. The non-volatile storage system of claim 1, wherein the DMA is a first DMA, and wherein the control circuit is further configured to:

responsive to the first DMA not accessing the entire data buffer, save the fetched data buffer pointer into the command context storage;

access the saved data buffer pointer from command context storage; and use the saved data buffer pointer to perform a second DMA to access a portion of the host data buffer pointed to by the data buffer pointer that the first DMA did not access.

12. A method of operating a non-volatile storage system, the method comprising:

accessing a command from a host system to access non-volatile memory cells in the non-volatile storage system, the command comprising a first field having a data buffer pointer to a data buffer and a second field having a first list pointer to a first list of data buffer pointers to data buffers in the host system;

storing, in command context storage in the non-volatile storage system, the first list pointer;

storing, in the command context storage, a second list pointer to a second list of data buffer pointers in the host system;

responsive to a determination that first data buffer pointers to be used for first direct memory accesses (DMAs) with respect to a first read operation or a first write operation of the non-volatile memory cells to respond to the command are within either the first list or the second list, using either the first list pointer or the second list pointer to fetch the first data buffer pointers, wherein the first data buffer pointers are fetched from the host system to storage in the non-volatile storage system;

responsive to a determination that second data buffer pointers to be used for second DMAs with respect to a second read operation or a second write operation of the non-volatile memory cells to respond to the command are not within either the first list or the second list, fetching a third list pointer from host system memory and using the third list pointer to fetch the second data buffer pointers, wherein the second data buffer pointers are fetched from the host system to storage in the non-volatile storage system; and performing the first DMAs between the non-volatile storage system and the data buffers in the host system pointed to by the fetched first data buffer pointers; and performing the second DMAs between the non-volatile storage system and the data buffers in the host system pointed to by the fetched second data buffer pointers.

13. The method of claim 12, further comprising:

responsive to a determination that the host data buffers pointed to by the first data buffer pointers have been fully accessed by the first DMAs, discarding the first data buffer pointers.

14. The method of claim 12, further comprising:
responsive to a particular DMA of the second DMAs accessing an entire host data buffer pointed to by a particular data buffer pointer of the second data buffer pointers, determining that the particular data buffer pointer should not be saved.

15. The method of claim 12, wherein:
the first list pointer points to a first list of non-volatile memory express (NVMe) physical region page (PRP) entries in the host system; and
the second list pointer points to a second list of NVMe PRP entries in the host system.

16. The method of claim 12, wherein using the third list pointer to fetch the second data buffer pointers comprises fetching the second data buffer pointers to data buffers of the host system after initiating the second read operation but before data read from a memory die is ready to be transferred to the host system.

17. The method of claim 12, further comprising:
saving data buffer pointers to host system data buffers in separate data buffer storage in the non-volatile storage system for each of a plurality of memory dies in the non-volatile storage system.

18. The method of claim 12, wherein using either the first list pointer or the second list pointer to fetch the first data buffer pointers and using the third list pointer to fetch the second data buffer pointers comprises:
fetching only data buffer pointers that fit in a single Transaction Layer Packet (TLP) packet over a PCIe bus.

19. A non-volatile storage system, comprising:
a plurality of memory dies of non-volatile memory cells;
means for accessing a command from a host system to access the non-volatile memory cells;
means for parsing the command to determine whether the command has a first field having a pointer to a data buffer and a second field having a first list pointer to a first list of data buffer pointers to data buffers in a host system;
means for storing the first list pointer;
means for storing a second list pointer to a second list of data buffer pointers in the host system;
means for initiating a memory array operation of non-volatile memory cells in a memory die in the non-volatile storage system responsive to the command;
means for using either the first list pointer or the second list pointer to access data buffer pointers to data buffers of the host system to be used for direct memory accesses (DMAs) of memory in the host system with respect to the memory array operation responsive to a determination that the data buffer pointers are within either the first list or the second list;
means for fetching a third list pointer from host system memory and using the third list pointer to access the data buffer pointers responsive to a determination that the data buffer pointers are not within either the first list or the second list and
means for performing the DMAs between the non-volatile storage system and the data buffers in the host system pointed to by the accessed data buffer pointers.

20. The method of claim 12, further comprising:
responsive to a first DMA for a particular data buffer pointer of the first data buffer pointers not accessing the entire data buffer pointed to by the particular data buffer pointer, saving the particular data buffer pointer into the command context storage;
accessing the saved particular data buffer pointer from command context storage; and
using the saved particular data buffer pointer to perform a second DMA to access a portion of the host data buffer pointed to by the particular data buffer pointer that the first DMA for the particular data buffer pointer did not access.

\* \* \* \* \*